(12) United States Patent
Shibuya et al.

(10) Patent No.: US 8,830,811 B2
(45) Date of Patent: *Sep. 9, 2014

(54) RESIN COMPOSITION AND OPTICAL COMPONENT

(75) Inventors: Atsushi Shibuya, Funabashi (JP); Masanori Iwazumi, Omuta (JP)

(73) Assignee: Mitsui Chemicals, Inc., Minato-ku, Tokyo (JP)

( * ) Notice: Subject to any disclaimer, the term of this patent is extended or adjusted under 35 U.S.C. 154(b) by 1351 days.

This patent is subject to a terminal disclaimer.

(21) Appl. No.: 11/918,641

(22) PCT Filed: Apr. 17, 2006

(86) PCT No.: PCT/JP2006/308033
§ 371 (c)(1),
(2), (4) Date: Oct. 17, 2007

(87) PCT Pub. No.: WO2006/112434
PCT Pub. Date: Oct. 26, 2006

(65) Prior Publication Data
US 2009/0310471 A1 Dec. 17, 2009

(30) Foreign Application Priority Data
Apr. 18, 2005 (JP) .................... 2005-119750

(51) Int. Cl.
*G11B 7/00* (2006.01)

(52) U.S. Cl.
USPC ......... 369/124.01; 524/99; 524/100; 524/102

(58) Field of Classification Search
USPC .......................................... 524/99, 100, 102
See application file for complete search history.

(56) References Cited

U.S. PATENT DOCUMENTS

| | | | | |
|---|---|---|---|---|
| 4,927,930 A | * | 5/1990 | Cantatore et al. | 524/100 |
| 5,015,679 A | * | 5/1991 | Matumura | 524/100 |
| 5,260,362 A | * | 11/1993 | Rody et al. | 524/100 |
| 5,362,811 A | * | 11/1994 | Sueyoshi et al. | 525/198 |
| 2005/0170180 A1 | | 8/2005 | Kawa | |

FOREIGN PATENT DOCUMENTS

| | | |
|---|---|---|
| JP | 60-026024 A | 2/1985 |
| JP | 60-168708 A | 9/1985 |
| JP | 61-115912 A | 6/1986 |
| JP | 61-115916 A | 6/1986 |
| JP | 61-120816 A | 6/1986 |
| JP | 61-271308 A | 12/1986 |
| JP | 61-272216 A | 12/1986 |
| JP | 62-252406 A | 11/1987 |
| JP | 62-252407 A | 11/1987 |
| JP | 63-145324 A | 6/1988 |
| JP | 63-275654 A | 11/1988 |
| JP | 07-7529 B2 | 1/1995 |
| JP | 09-506501 A | 6/1997 |
| JP | 09-508170 A | 8/1997 |
| JP | 09-268250 A | 10/1997 |
| JP | 2001-026682 A | 1/2001 |
| JP | 2001-072839 A | 3/2001 |
| JP | 2003-276047 A | 9/2003 |
| JP | 2004-83813 A | 3/2004 |
| JP | 2004-149782 | 5/2004 |
| JP | 2005-112809 A | 4/2005 |
| JP | 2005-353179 A | 12/2005 |
| JP | 2006-045545 A | 2/2006 |
| WO | WO 94/27698 A2 | 12/1994 |
| WO | WO 95/20619 A1 | 8/1995 |
| WO | WO 00/69956 A1 | 11/2000 |
| WO | WO 01/92412 A1 | 12/2001 |
| WO | WO 02/12362 A1 | 2/2002 |

OTHER PUBLICATIONS

Publication 4: Optical Transparent Resin (Technical Information Institute Co., Ltd.) Dec. 17, 2001, pp. 77-80.
Publication 5: Polymer Additive: Basic Chemistry and Material Design (CMC Publishing Co., Ltd.), 1 Page.
Publication 6: New Developments of Polymer Additive (The Nikkan Kogyo Shimbun, Ltd.), Sep. 30, 1998, 3 Pages.
Office Action issued in the corresponding Japanese Patent Application No. 2007-528137 dated Apr. 6, 2010, and a partial English Translation thereof.

* cited by examiner

*Primary Examiner* — Ling Choi
*Assistant Examiner* — Wenwen Cai
(74) *Attorney, Agent, or Firm* — Buchanan, Ingersoll & Rooney PC

(57) ABSTRACT

There are provided a resin composition that is suitable for an optical component which, while maintaining moldability, low birefringence, heat resistance, mass productivity, mechanical strength, and light transmittance, hardly exhibits a low light transmittance during the use of a blue-violet laser beam source and a deterioration in optical properties, and an optical component produced by molding the resin composition, and a optical pickup device using the optical component. The present invention provides a resin composition comprising 0.05 to 5 parts by weight of the specific hindered amine compound based on 100 parts by weight of the polymer having an alicyclic structure in at least a part of repeating structural unit, an optical component produced by molding the resin composition, and a optical pickup device using the optical component.

15 Claims, 1 Drawing Sheet

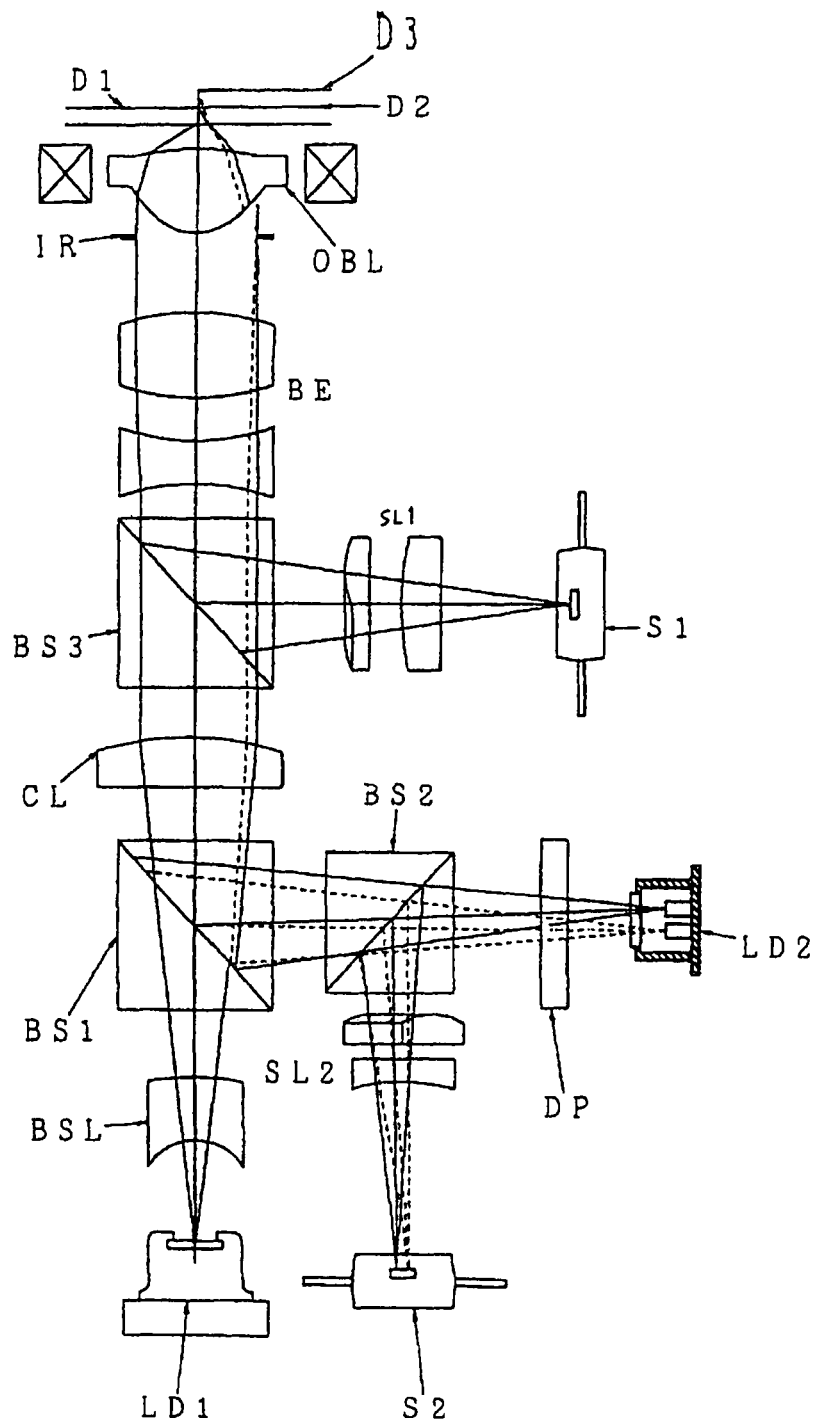

RESIN COMPOSITION AND OPTICAL COMPONENT

TECHNICAL FIELD

The present invention relates to a resin composition that is excellent in the optical properties such as light transmittance, an optical component produced by molding the resin composition, and a optical pickup device using the optical component. Specifically, the present invention relates to a optical pickup device employing a blue-violet laser light beam source with a wavelength of around 405 nm, a resin composition suitable for the use in the optical component used for the optical pickup device, an optical component produced by molding the resin composition, and a optical pickup device using the optical component.

BACKGROUND ART

The optical pickup device (also referred to as an optical head, an optical head device, or the like) for replaying and recording the information on a light information recording medium (also referred to as an optical disk, or a medium) such as a CD (a compact disk), DVD (a digital video disk, or a digital versatile disk) have been developed and produced, and thus popularized. Recently, the standard of the information recording medium which enabled the higher density information recording has been researched and developed.

Such optical pickup device forms a spot by collecting beam of light emitted from mainly a laser diode as a light source through an optical system including an optical component such as a beam shaping prism, a collimator, a beam splitter, an objective optical component, or the like, onto the information recording face of an optical disc, next collects reflection from an information recording hole (also called as a pit) on the recording face through a same optical system onto a sensor at this time, and then converts into an electrical signal, to playback the information. During this time, '0' and '1' information are discriminated based on the phenomenon that the light beam of reflectance varies according to the shape of the information recording hole. On the information recording face of an optical disc, a protective layer made of plastic, which is also called as a cover glass, is provided as a protective substrate.

When recording information on recording type media such as CD-R, CD-RW, and the like, a spot resulted from the laser beam is formed on a recording surface and a thermochemical change is generated in a recording material on the recording face. Accordingly, for example in the case of CD-R, the thermal diffusivity pigment is irreversibly changed and a shape same to the information recording hole is formed. In the case of CD-RW, since a phase change-type material is used, a reversible change between a crystalline state and non-crystalline state by the thermochemical change is generated, and thus the rewriting of the information is possible.

For the optical pickup device for playing back the information from an optical disc of a CD standard, the numerical aperture (NA) of an objective lens is around 0.45, and the wavelength of a light source for use is around 785 nm. In addition, as for the recording, ones having 0.50 in approximate is a lot used. Herein, the thickness of a protective substrate for an optical disc of the CD standard is 1.2 mm.

A CD has been widely popularized as an optical information recording medium, and for the last few years, a DVD is popularized. The DVD is increased in its information recording capacity by making the thickness of the protective substrate thinner than the CD and also by miniaturizing the information recording hole. While a recording capacity of a CD is about 600 to 700 MB (Mega Bite), a DVD has a large recording capacity of about 4.7 GB (Giga Byte), thus being used a lot as a distribution medium to which a moving image such as a movie picture is recorded.

In addition, the optical pickup device for playing back the information from an optical disc of a DVD standard is principally the same as that of the CD. However, since the information recording hole is miniaturized as described above, the optical pickup device employs an objective lens having the NA of around 0.60, and a light source having the wavelength of around 655 nm. Further, as for the recording, ones having 0.65 in approximate is more often used. Herein, the thickness of the protective substrate for an optical disc of the DVD standard is 0.6 mm.

A recording type for the optical disc of the DVD standard is already put to practical use, and there are various standards such as DVD-RAM, DVD-RW/R, DVD+RW/R, and the like. The technical principal of these optical disc is also same as that of the CD standard. As described above, there has been proposed an optical disc of high density/high capacity. This optical disc is to use the light source for providing the light having a wavelength of around 405 nm, which is the light source for providing so-called a blue-violet laser. For such 'optical disc of high density', even if the wavelength to be used is determined, the thickness of the protective substrate, recording capacity, NA, and the like cannot be determined in a single uniform way.

If a way to improve the recording density substantially is selected, the thickness of the protective substrate of an optical disc is reduced, and accordingly the NA is increased. Alternatively, the thickness of the protective substrate and NA can be in the same standard as the conventional optical disc standard. At this time, the physical recording density is not significantly increased, but the properties required as the optical system become relatively gradual. In specific, there is proposed a protective substrate such as further reduced ones having the thickness of 0.1 mm, or ones same with DVD of 0.6 mm.

The optical component to be used in the above-described optical pickup device is mostly formed by an injection molding with a plastic resin or pressure molding with a glass. Of these, the glass-made optical component is generally small in the refractive-index variance to a temperature change. Therefore, this element can be used in a beam shaping prism disposed nearby a light source which is the heat source. However there is a problem that the manufacturing cost is high. Therefore, it is less employed in each of optical components of collimator, coupling lens, objective optical component, and the like. On the other hand, the plastic resin-made optical component has a merit that the manufacturing cost is low as it is molded by injection, and thus is used a lot to a large extent. However, since the plastic material has an absorption in the wavelength area to various degrees or another, there is a problem that the optical properties for a use are deteriorated.

Hence, in order to perform a playing back of information (reading) or recording of information at high speed, it is necessary to improve the light amount to surely form a spot of collected light. For this, a most simple method is to increase the light emitting amount of the diode by raising the power of a laser diode, but due to this if optical properties involved in the use are increasingly deteriorated, a problem arises in that the optical properties as designed cannot be attained. In addition, increase in an atmospheric temperature due to the raise of the laser power becomes a factor that promotes a deterioration of the resin. Further, if the operation is carried out at high speed, the actuator also operates at high speed, and thus generated heat also becomes a factor that promotes a deterioration of the resin.

Accordingly, there is proposed various efforts to control the change of the optical properties at the time of use.

For example, in Patent Document 1, there is disclosed a technique of blending 0.03 to 1 parts by mass of a hindered amine light-resistant stabilizer, 0.002 to 2 parts by mass of phenol antioxidant, and 0.002 to 1 parts by mass of phosphorous antioxidant, based on 100 parts by mass of a thermoplastic norbornene resin (for example, a hydroxide additive of ring-opening polymer of 1,4-methano-1,4,4a,9a-tetrahydrofluorene). However, the stability for light of a resin composition disclosed in Patent Document 1 is not sufficient, and thus is not appropriate to be used in an optical pickup device having the blue-violet laser light source. In addition, there is a flaw in transmittance that it is lowered due to a coloring as salt is formed by the phenol antioxidant and the hindered amine light-resistant stabilizer. There are also problems that the foaming at the time of molding is easy to occur, and since the birefringence is poor, an optical component of high density cannot be obtained.

Also, for example in Patent Document 2, there is disclosed a technique to obtain a resin composition excellent in a processing stability, light-resistant stability, thermal resistance, and transparency, by containing a vinyl alicyclic hydrocarbon polymer and a hindered amine light-resistant stabilizer having the number average molecular weight (Mn) of 1,000 to 10,000. According to the method, the foaming at the time of molding and the birefringence are improved as compared to the above-described technique, but still the stability for light is insufficient, and thus is not appropriate to be used in an optical pickup device having the blue-violet laser light source. In addition, this method has a flaw in that white turbidity occurs due to the blue-violet laser light irradiation.

Further, in Patent Document 3, as the resin composition having excellent weather resistance, light resistance, transparency, thermal resistance, and a low dusting characteristic at the time of molding process, and exhibiting excellent optical properties when molded to an optical component, there is disclosed a weather-resistant resin characterized by containing (A) a cyclic polyolefin-based resin, (B) benzotriazole-based UV absorbent having the molecular weight of 300 or more, the vapor pressure at 20° C. temperature of $1\times10^{-8}$ Pa or less, and the 5% weight reducing temperature with a heat loss measurement of 200° C. or above, and (C) a hindered amine light stabilizer having the molecular weight of 500 or more, the vapor pressure at 20° C. temperature of $1\times10^{-6}$ Pa or less, and the 5% weight reducing temperature with a heat loss measurement of 250° C. or above. According to the method, the thermal resistance is improved and the foaming at the time of molding is controlled as in the above-described technique, but there is absorption with the benzotriazole ultraviolet absorber, and thus is not appropriate to be used in an optical pickup device having the blue-violet laser light source. In addition, there is a flaw that the water absorption is high.

In Patent Document 4, in order to obtain a molded product with no coloration and no color change although irradiated with UV ray for a long period, there is disclosed a technique of mixing pellet A formed from a resin composition containing 100 parts by mass of a vinyl alicyclic hydrocarbon polymer and 0.001 to 2.0 parts by mass of an antioxidant with pellet B formed from a resin composition containing 100 parts by mass of a vinyl alicyclic hydrocarbon polymer and 2 to 20 parts by mass of a light-resistant stabilizer at a ratio of $5 \leq A/B \leq 50$ by mass, and then melt-molding the resultant. However, the stability at the time of molding is deteriorated, and the transparency of the resin and the stability for the light are both insufficient, thus is not appropriate to be practically used in an optical pickup device using the blue-violet laser light source. In addition, the method is inappropriate for a large-scale production as the manufacturing and molding processes are complicated.

In the Patent Document 5, there is disclosed a resin composition comprising a polymer (A) which is produced by subjecting an aromatic vinyl monomer to an addition polymerization reaction, and then hydrogenating an aromatic ring, and an antioxidant (B) having a phosphate ester structure and a phenol structure in a molecule such as 6-[3-(3-t-butyl-4-hydroxy-5-methylphenyl)propoxy]-2,4,8,10-tet-rakis-t-butyldibenzo[d,f][1.3.2]dioxaphosphepin. It is described that the molded product of the resin composition is excellent in mechanical strength, and is not colored even with the irradiation of a light beam such as a blue-violet laser with a short wavelength and a high strength. However, the optical properties are still not sufficiently stable due to a deterioration of the resin during the use. Thus, it is difficult that the resin composition is used for a optical pickup device using a blue-violet laser beam source.

[Patent Document 1] Japanese Unexamined Patent Application Publication No. 9-268250

[Patent Document 2] WO 01/092412

[Patent Document 3] Japanese Unexamined Patent Application Publication No. 2001-72839

[Patent Document 4] Japanese Unexamined Patent Application Publication No. 2003-276047

[Patent Document 5] Japanese Unexamined Patent Application Publication No. 2004-83813

DISCLOSURE OF THE PRESENT INVENTION

It is an object of the present invention to provide a resin composition that is suitable for an optical component which, while maintaining moldability, low birefringence, heat resistance, mass productivity, mechanical strength, and light transmittance, is very small in the lowering in light transmittance during the use of a blue-violet laser beam source, as well as in the deterioration in optical properties, and an optical component produced by molding the resin composition and a optical pickup device using the optical component.

The present inventors have found that the above problems are solved by a resin composition including a polymer having an alicyclic structure in at least a part of repeating structural unit and specific hindered amine compound, and completed the present invention.

That is, the present invention provides (1) resin composition, (2) optical component, and (3) optical pickup device.

(1) A resin composition including:

a polymer having an alicyclic structure in at least a part of repeating structural unit; and a hindered amine compound represented by the general formula (1), wherein the hindered amine compound is contained in the amount of 0.05 to 5 parts by weight, based on 100 parts by weight of the polymer:

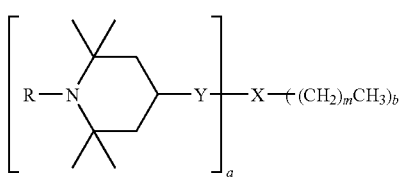

(1)

wherein R is a hydrogen atom, an alkyl group having 1 to 9 carbon atoms, an alkoxy group having 1 to 9 carbon atoms, or an acyl group having 2 to 9 carbon atoms;

X is a direct bond, or an (a+b)-valent group having a molecular weight of 12 to 10,000 and containing at least one selected from a carbon atom, a hydrogen atom, an oxygen atom, a nitrogen atom, a phosphorus atom;

Y is a direct bond, or a group having a molecular weight of 12 to 10,000 containing at least one selected from a carbon atom, a hydrogen atom, an oxygen atom, a nitrogen atom, a phosphorus atom;

R, X, and Y may be present in one kind alone, or in a combination of two or more kinds at any ratio; and a is a real number of 1 to 50, b is a real number of 1 to 50, and m is a real number of 0 to 50.

(2) An optical component produced by molding the resin composition as described in (1).

(3) A optical pickup device employing the optical component as described in (2).

The resin composition of the present invention is suitably used for optical components, since the resin composition provides an optical component which, while maintaining moldability, low birefringence, heat resistance, mass productivity, mechanical strength, and light transmittance, is very small in the lowering in light transmittance during the use of a blue-violet laser beam source, as well as in the deterioration in optical properties. The optical component and optical pickup device comprised of the resin composition of the present invention is hardly deteriorated even if using a laser beam near a violet region while maintaining sufficient optical properties, the performance is hardly changed in the use, and thus valuable in the technical field.

BRIEF DESCRIPTION OF THE DRAWINGS

The object described above, the other object, and characteristics and advantages will be obvious with reference to the suitable mode described as follows, and the following drawing attached thereto.

FIG. 1 is a figure of a optical pickup device related to the present invention.

BEST MODE FOR CARRYING OUT THE INVENTION

Hereinafter, the present invention will be explained in detail.

[Polymer Having Alicyclic Structure in at Least a Part of Repeating Structural Unit]

The polymer having an alicyclic-structure in at least a part of repeating structural unit of the present invention (hereinafter, also simply referred to as "polymer having an alicyclic structure") may be those having an alicyclic structure in at least a part of repeating structural unit, and specifically preferred is those having at least one polymer represented by the general formula (2):

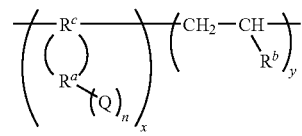

(2)

wherein x and y each represent a copolymerization ratio, and are each a real number satisfying $0/100 \leq y/x \leq 95/5$; with x and y being presented on a molar basis;

n is a number of a substituent Q which is an integer of $0 \leq n \leq 2$, and preferably 0;

$R^a$ is a (2+n)-valent group selected from the group consisting of a hydrocarbon group having 2 to 20 carbon atoms, preferably having 2 to 12 carbon atoms;

$R^b$ is a hydrogen atom or a monovalent group selected from the group consisting of a hydrocarbon group having 1 to 10 carbon atoms;

$R^c$ is a tetravalent group selected from the group consisting of a hydrocarbon group having 2 to 10 carbon atoms, preferably having 2 to 5 carbon atoms;

Q is $COOR^d$, $R^d$ is a hydrogen atom or a monovalent group selected from the group consisting of a hydrocarbon group having 1 to 10 carbon atoms, and preferably a hydrogen atom and a hydrocarbon group having 1 to 3 carbon atoms; and $R^a$, $R^b$, $R^c$, and Q may be present in one kind alone, or in a combination of two or more kinds at any ratio.

In addition, in the general formula (2), $R^a$ is preferably at least one or more divalent group selected from the group consisting of a hydrocarbon group having 2 to 12 carbon atoms, more preferably a divalent group represented by the general formula (3), when n=0, and most preferably a divalent group in which p is 0 or 1 in the general formula (3), wherein the structure of $R^a$ may be one kind, or may be contained in the combination of two or more kinds:

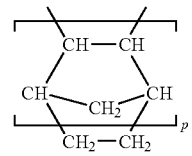

(3)

wherein p is an integer of 0 to 2.

In addition, in the general formula (2), as $R^b$ may be exemplified by a hydrogen atom, a methyl group, an ethyl group, an n-propyl group, an i-propyl group, an n-butyl group, or a 2-methyl propyl group, but preferably is a hydrogen atom or/and a methyl group, and most preferably a hydrogen atom.

In addition, in the general formula (2), $R^c$ may be exemplified by the following general formulae (4) to (6), when n=0:

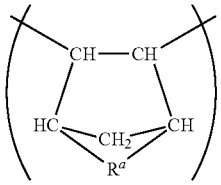

(4)

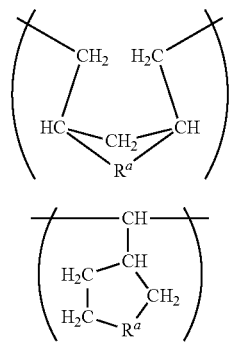

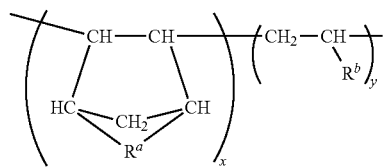

wherein $R^a$ is the same as those in the general formula (2).

In addition, in the general formula (2), n is preferably 0.

For the type of the polymerization, there is no limitation in the present invention, known, various polymerization types such as an addition polymerization, and a ring-opening polymerization may be applied. The addition polymerization may be exemplified by a random copolymer, a block copolymer, an alternating copolymerization, or the like. In the present invention, from the view point of preventing the deterioration in optical properties, a random copolymer may be preferably used.

When the structure of the resin used as main component is those described above, the high-accuracy optical component which is excellent in the optical properties such as transparency, refringence, and birefringence may be obtained.

(Example of the Polymer Having Alicyclic Structure in at Least a Part of Repeating Structural Unit)

The polymer represented by the general formula (2) is classified broadly into 4 types of polymer describe as followings (i) to (iv):

(i) a copolymer of ethylene or α-olefin with cyclic olefin, (ii) a ring-opening polymer or the hydrogenation product thereof (iii) a hydrogenation product of polystyrene derivative, (iv) the other polymer.

These will be explained in the order as follows.

[(i) Copolymer of Ethylene or α-olefin with Cyclic Olefin]

(i) A copolymer of ethylene or α-olefin with cyclic olefin is a cyclic olefin copolymer represented by the general formula (7), for example, including a constituent unit (A) derived from ethylene or a straight chain or branched chain α-olefin having 3 to 30 carbon atoms and a constituent unit (B) derived from cyclic olefin:

wherein $R^a$ is a divalent group selected from the group consisting of a hydrocarbon group having 2 to 20 carbon atoms, preferably having 2 to 12 carbon atoms;

$R^b$ is a hydrogen atom or a monovalent group selected from the group consisting of a hydrocarbon group having 1 to 10 carbon atoms, preferably having 1 to 5 carbon atoms;

$R^a$ and $R^b$ may be present in one kind alone, or in a combination of two or more kinds at any ratio; and x and y each represent a copolymerization ratio, and are each a real number satisfying $5/95 \leq y/x \leq 95/5$, preferably $50/50 \leq y/x \leq 95/5$, and more preferably $55/45 \leq y/x \leq 80/20$; with x and y being presented on a molar basis.

(Constituent Unit (A) Derived from Ethylene or α-olefin)

Constituent Unit (A) derived from ethylene or α-olefin is a constituent unit derived from ethylene or a straight chain or branched chain α-olefin having 3 to 30 carbon atoms described as follows.

Specific examples include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicosene. Among these, ethylene is preferable. The constituent unit derived from ethylene or α-olefin may be contained two or more thereof, within the range of not losing the effect of the present invention.

(Constituent Unit (B) Derived from Cyclic Olefin)

The constituent unit (B) derived from cyclic olefin comprises at least one selected from group constituting a constituent unit derived from cyclic olefin represented by the following general formulae (8), (9) and (10).

The constituent unit (B) derived from cyclic olefin comprises represented by the general formula (8) is those having the following structure:

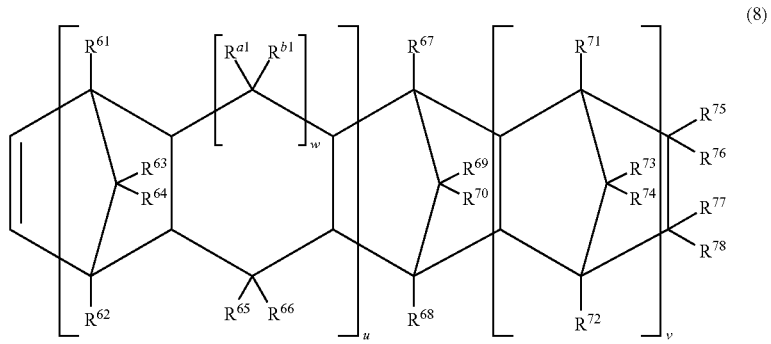

wherein u is 0 or 1, v is 0 or a positive integer, w is 0 or 1; a ring represented by w becomes a 6-membered ring, when w is 1, a ring represented by w becomes a 5-membered ring, when w is 0; $R^{61}$ to $R^{78}$, and $R^{a1}$ and $R^{b1}$ may be the same or different from each other, a hydrogen atom, a halogen atom, or a hydrocarbon group.

The halogen atom includes a fluorine atom, a chlorine atom, a bromine atom, and an iodine atom. The hydrocarbon group may be exemplified by generally an alkyl group having 1 to 20 carbon atoms, a halogenated alkyl group having 1 to 20 carbon atoms, a cycloalkyl group having 3 to 15 carbon atoms, or an aromatic hydrocarbon group.

More specifically, the alkyl group may be exemplified by methyl, ethyl, propyl, isopropyl, amyl, hexyl, octyl, decyl, dodecyl, octadecyl or the like. The halogenated alkyl group may be exemplified by the alkyl group having 1 to 20 carbon atoms to which one or a plurality of halogen atoms is replaced. The cycloalkyl group may be exemplified by cyclohexyl or the like, and the aromatic hydrocarbon group may be exemplified by phenyl, naphthyl, or the like.

Furthermore, in the general formula (8), $R^{75}$ and $R^{76}$, $R^{77}$ and $R^{78}$, $R^{75}$ and $R^{77}$, $R^{76}$ and $R^{78}$, $R^{75}$ and $R^{78}$, or $R^{76}$ and $R^{77}$, may be bonded respectively, that is, may be jointly form a monocyclic or polycyclic group together with each other. Thus formed monocyclic or polycyclic ring may have a double bond. Since the copolymer having a high glass transition temperature (Tg) obtained from lower amount of the polycyclic ring as compared with the monocyclic polymer, the polycyclic ring is preferred from the view point of the heat resistance. In addition, there is advantage capable of producing copolymer with lower amount of cyclic olefin. The monocyclic or polycyclic group formed herein may be specifically exemplified by followings:

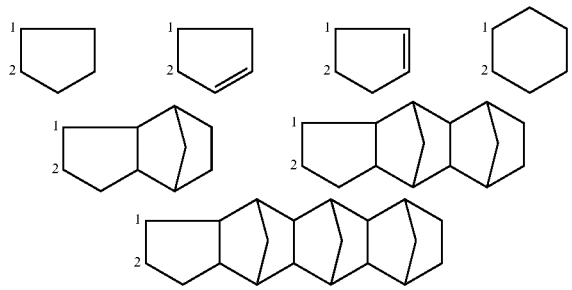

wherein the carbon atom numbered 1 or 2 is a carbon atom to which $R^{75}$ ($R^{76}$) or $R^{77}$ ($R^{78}$) is bonded.

$R^{75}$ and $R^{76}$, or $R^{77}$ and $R^{78}$ may be form an alkylidene group. The alkylidene group has generally 2 to 20 carbon atoms. The specific examples of the alkylidene group include ethylidene, propylidene, and isopropylidene.

The constituent unit (B) derived from cyclic olefin represented by the general formula (9) is those having the following structure:

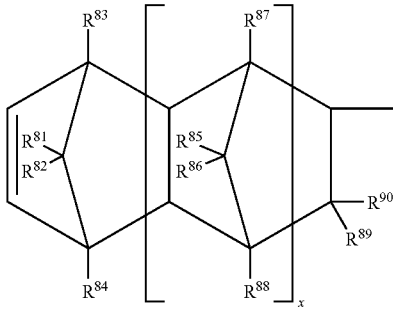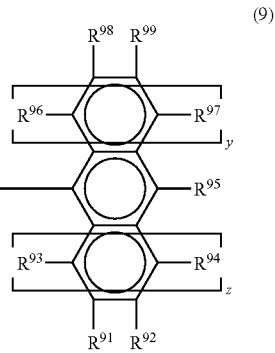

(9)

wherein x and d are 0 or a positive integer of not less than 1, y and z are 0, 1 or 2; $R^{51}$ to $R^{99}$ may be the same or different from each other, a hydrogen atom, a halogen atom, an aliphatic hydrocarbon group, an aromatic hydrocarbon group, or an alkoxy group, the carbon atom to which $R^{89}$ and $R^{90}$ are bonded, and the carbon atom to which $R^{93}$ is bonded, or the carbon atom to which $R^{91}$ is bonded, may be bonded directly or through an alkylene group having 1 to 3 carbon atoms; $R^{95}$ and $R^{92}$, or $R^{95}$ and $R^{99}$ may be bonded each other to form a monocyclic ring or polycyclic aromatic ring, when y=z=0.

The halogen atom may be exemplified by the same as the halogen atom in the formula (8).

The aliphatic hydrocarbon group may be exemplified by an alkyl group having 1 to 20 carbon atoms or a cycloalkyl group having 3 to 15 carbon atoms. More specifically, the alkyl group may be exemplified by methyl, ethyl, propyl, isopropyl, amyl, hexyl, octyl, decyl, dodecyl, octadecyl or the like. The cycloalkyl group may be exemplified by cyclohexyl or the like.

The aromatic hydrocarbon group may be exemplified by an aryl group, an aralkyl group, or the like. The specific examples include phenyl, tolyl, naphthyl, benzyl, phenylethyl.

The alkoxyl group may be exemplified by methoxy, ethoxy, propoxy, or the like. Herein, the carbon atom to which $R^{89}$ and $R^{90}$ are bonded, and the carbon atom to which $R^{93}$ is bonded, or the carbon atom to which $R^{91}$ is bonded, may be bonded directly or through an alkylene group having 1 to 3 carbon atoms. That is, when two of above carbon atoms are bonded through the alkylene group, $R^{89}$ and $R^{93}$, or $R^{90}$ and $R^{91}$ together form any one of the alkylene group of a methylene group (—$CH^2$—), an ethylene group (—$CH^2$—$CH^2$—), and a propylene group (—$CH_2$—$CH_2$—$CH^2$—).

In addition, $R^{95}$ and $R^{92}$, or $R^{95}$ and $R^{99}$ may be bonded each other to form a monocyclic ring or polycyclic aromatic ring, when y=z=0. Specifically, the following aromatic ring formed $R^{95}$ and $R^{92}$, when y=z=0 may be exemplified. Since the copolymer having a high glass transition temperature (Tg) obtained from lower amount of the polycyclic ring as compared with the monocyclic polymer, the polycyclic ring is preferred from the view point of the heat resistance. In addition, there is advantage capable of producing copolymer with lower amount of cyclic olefin.

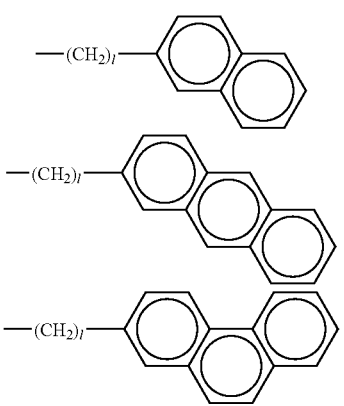

l is the same as d in the general formula (9).

The constituent unit (B) derived from cyclic olefin represented by the general formula (10) is those having the following structure:

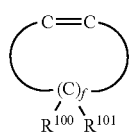
(10)

wherein $R^{100}$ and $R^{101}$ may be the same or different from each other, a hydrogen atom or a hydrocarbon group having 1 to 5 carbon atoms; f is $1 \leq f \leq 18$. The hydrocarbon group having 1 to 5 carbon atoms may be preferably exemplified by an alkyl group, a halogenated alkyl group, or a cycloalkyl group. The specific examples thereof is obvious from the specific examples of $R^{61}$ to $R^{78}$ in the formula (8).

Specific examples of the constituent unit (B) derived from cyclic olefin represented by the general formula (8), (9), or (10) include a bicyclo-2-heptene derivative (bicyclohept-2-en derivative), a tricyclo-3-decene derivative, a tricyclo-3-undecene derivative, a tetracyclo-3-dodecene derivative, a pentacyclo-4-pentadecene derivative, a pentacyclopentadecadiene derivative, a pentacyclo-3-pentadecene derivative, a pentacyclo-4-hexadecene derivative, a pentacyclo-3-hexadecene derivative, a hexacyclo-4-heptadecene derivative, a heptacyclo-5-eicosene derivative, a heptacyclo-4-eicosene derivative, a heptacyclo-5-heneicosene derivative, an octacyclo-5-docosene derivative, a nonacyclo-5-pentacosene derivative, a nonacyclo-6-hexacosene derivative, a cyclopentadiene-acenaphthylene adduct derivative, a 1,4-methano-1,4,4a,9a-tetrahydrofluorene derivative, a 1,4-methano-1,4,4a,5,10,10a-hexahydroanthracene derivative, and a cycloalkylene derivative having 3 to 20 carbon atoms.

Among the constituent unit (B) derived from cyclic olefin represented by the general formula (8), (9), or (10), a tetracyclo[$4.4.0.1^{2,5}.1^{7,10}$]-3-dodecene derivative and a hexacyclo[$6.6.1.1^{3,6}.1^{10,13}.0^{2,7}.0^{9,14}$]-4-heptadecene derivative are preferred, particularly a tetracyclo[$4.4.0.1^{2,5}.1^{7,10}$]-3-dodecene derivative is preferred.

The constituent unit (B) derived from cyclic olefin represented by the general formula (8) or (9) may be produced by subjecting cyclopentadine and olefins having a structure corresponding thereto, to the Diels-Alder reaction. Two or more of these constituent unit (B) derived from cyclic olefin represented by the general formula (8), (9), or (10) may be contained. Those produced by polymerizing the monomer may be altered, if necessary, and in the case, the alteration may be performed by changing the structure of the structural unit derived from monomer. For example, the benzene ring or the like in the structural unit derived from monomer may be changed to a cyclohexyl ring under some condition by a hydrogen addition treatment.

In the present invention, "(i) a copolymer of ethylene or α-olefin with cyclic olefin" is preferably a copolymer including ethylene and tetracyclo[$4.4.0.1^{2,5}.1^{7,10}$]-3-dodecene.

For the type of the copolymerization, there is no limitation in the present invention, known, various copolymerization types such as a random copolymer, a block copolymer, an alternating copolymerization, may be applied, but random copolymer may be preferably applied.

[(ii) Ring-Opening Polymer or Hydrogenation Product Thereof]

(ii) A ring-opening polymer or the hydrogenation product thereof is a cyclic olefin polymer including a constituent unit represented by the general formula (5), among the structure exemplified as preferred example in the general formula (2).

In addition, the cyclic olefin polymer may be those having a polar group. Examples of the polar group include a hydroxyl group, a carboxyl group, an alkoxy group, an epoxy group, a glycidyl group, an oxycarbonyl group, a carbonyl group, an amino group, and an ester group.

The cyclic olefin polymer can be obtained by generally polymerizing cyclic olefin, and specifically ring-opening alicyclic olefin. In addition, the cyclic olefin polymer having a polar group can be obtained by for example, introducing a compound having a polar group into the cyclic olefin polymer by the alteration reaction, or copolymerizing a monomer containing a polar group as a copolymerization component.

Specific examples of the alicyclic olefin used for obtaining the cyclic olefin polymer include a norbornene monomer such as bicyclo[2.2.1]-hept-2-ene (trivial name: norbornene), 5-methyl-bicyclo[2.2.1]-hept-2-ene, 5,5-dimethyl-bicyclo[2.2.1]-hept-2-ene, 5-ethyl-bicyclo[2.2.1]-hept-2-ene, 5-butyl-bicyclo[2.2.1]-hept-2-ene, 5-hexyl-bicyclo[2.2.1]-hept-2-ene, 5-octyl-bicyclo[2.2.1]-hept-2-ene, 5-octadecyl-bicyclo[2.2.1]-hept-2-ene, 5-ethylidene-bicyclo[2.2.1]-hept-2-ene, 5-methylidene-bicyclo[2.2.1]-hept-2-ene, 5-vinyl-bicyclo[2.2.1]-hept-2-ene, 5-propenyl-bicyclo[2.2.1]-hept-2-ene, 5-methoxy-carbinyl-bicyclo[2.2.1]-hept-2-ene, 5-cyano-bicyclo[2.2.1]-hept-2-ene, 5-methyl-5-methoxycarbonyl-bicyclo[2.2.1]-hept-2-ene, 5-ethoxycarbonyl-bicyclo[2.2.1]-hept-2-ene, bicyclo[2.2.1]-hept-5-enyl-2-methylpropionate, bicyclo[2.2.1]-hept-5-enyl-2-methyloctanate, bicyclo[2.2.1]-hept-2-ene-5,6-dicarboxylic anhydride, 5-hydroxymethylbicyclo[2.2.1]-hept-2-ene, 5,6-di(hydroxymethyl)-bicyclo[2.2.1]-hept-2-ene, 5-hydroxy-i-propylbicyclo[2.2.1]-hept-2-ene, 5,6-dicarboxy-bicyclo[2.2.1]-hept-2-ene, bicyclo[2.2.1]-hept-2-ene-5,6-dicarboxylic imide, 5-cyclopentyl-bicyclo[2.2.1]-hept-2-ene, 5-cyclohexyl-bicyclo[2.2.1]-hept-2-ene, 5-cyclohexenyl-bicyclo[2.2.1]-hept-2-ene, 5-phenyl-bicyclo[2.2.1]-hept-2-ene, tricyclo[$4.3.0.1^{2,5}$]deca-3,7-diene (trivial name: dicyclopentadiene), tricyclo[$4.3.0.1^{2,5}$]deca-3-ene, tricyclo[$4.4.0.1^{2,5}$]undeca-3,7-diene, tricyclo[$4.4.0.1^{2,5}$]undeca-3,8-diene, tricycle[$4.4.0.1^{2,5}$]undeca-3-ene, tetracyclo[$7.4.0.1^{10,13}0^{2,7}$]-trideca-2,4,6-11-tetraene (another name: 1,4-methano-1,4,4a,9a-tetrahydrofluorene), tetracyclo[$8.4.0.1^{11,14}.0^{3,8}$]-tetradeca-3,5,7,12-11-tetraene (another name: 1,4-methano-1,4,4a,5,10,10a-hexahydroanthracene), tetracyclo[$4.4.0.1^{2,5}.1^{7,10}$]-dodeca-3-ene (trivial name: tetracyclododecene), 8-methyl-tetracyclo[$4.4.0.1^{2,5}.1^{7,10}$]-dodeca-3-ene, 8-ethyl-tetracyclo[$4.4.0.1^{2,5}.1^{7,10}$]-dodeca-3-ene, 8-methylidene-tetracyclo

[4.4.0.1$^{2,5}$.1$^{7,10}$]-dodeca-3-ene, 8-ethylidene-tetracyclo[4.4.0.1$^{2,5}$.0$^{7,10}$]-dodeca-3-ene, 8-vinyl-tetracyclo[4.4.0.1$^{2,5}$.1$^{7,10}$]-dodeca-3-ene, 8-propenyl-tetracyclo[4.4.0.1$^{2,5}$.1$^{7,10}$]-dodeca-3-ene, 8-methoxycarbonyl-tetracyclo[4.4.0.1$^{2,5}$.1$^{7,10}$]-dodeca-3-ene, 8-methyl-8-methoxycarbonyl-tetracyclo[4.4.0.1$^{2,5}$.1$^{7,10}$]-dodeca-3-ene, 8-hydroxymethyl-tetracyclo[4.4.0.1$^{2,5}$.1$^{7,10}$]-dodeca-3-ene, 8-carboxy-tetracyclo[4.4.0.1$^{2,5}$.1$^{7,10}$]-dodeca-3-ene, 8-cyclopentyl-tetracyclo[4.4.0.1$^{2,5}$.1$^{7,10}$]-dodeca-3-ene, 8-cyclohexyl-tetracyclo[4.4.0.1$^{2,5}$.1$^{7,10}$]-dodeca-3-ene, 8-cyclohexenyl-tetracyclo[4.4.0.1$^{2,5}$.1$^{7,10}$]-dodeca-3-ene, 8-phenyl-tetracyclo[4.4.0.1$^{2,5}$.1$^{7,10}$]-dodeca-3-ene, pentacyclo[6.5.1.1$^{3,6}$.0$^{2,7}$.0$^{9,13}$]pentadeca-3,10-diene, pentacyclo[7.4.0.1$^{3,6}$.1$^{10,13}$.0$^{2,7}$]-pentadeca-4,11-diene;

monocyclic cycloalkene such as cyclobutene, cyclopentene, cyclohexene, 3,4-dimethylcyclopentene, 3-methylcyclohexene, 2-(2-methylbutyl)-1-cyclohexene, cyclooctene, 3a,5,6,7a-tetrahydro-4,7-methano-1H-indene, cycloheptene; a vinyl alicyclic hydrocarbon monomer such as vinylcyclohexene and vinylcyclohexane; and an alicyclic conjugated diene monomer such as cyclopentadiene, and cyclohexadiene. The alicyclic olefin may be used independently or in the combination of two or more thereof.

The monomer capable of copolymerizing may be copolymerized, if necessary. The specific examples of the monomer include α-olefin each having 2 to 20 carbon atoms such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene; cycloolefin such as cyclobutene, cyclopentene, cyclohexene, 3,4-dimethylcyclopentene, 3-methylcyclohexene, 2-(2-methylbutyl)-1-cyclohexene, cyclooctene, 3a,5,6,7a-tetrahydro-4,7-methano-1H-indene; nonconjugated diene such as 1,4-hexadiene, 4-methyl-1,4-hexadiene, 5-methyl-1,4-hexadiene, and 1,7-octadiene. These monomers may be used independently or in the combination of two or more thereof.

For the polymerization method of the alicyclic olefin, there is no limitation, and the polymerization may be carried out in accordance with the known method. These ring-opening polymers are preferably used being subjected to a hydrogen addition, from the aspect of heat resistance, stability, and optical properties. For the hydrogen addition method, a known method may be used.

[(iii) Hydrogenation Product of Polystyrene Derivative]

(iii) A hydrogenation product of a polystyrene derivative is a hydrogenation product of a (co)polymer produced from a vinyl compound as a monomer. The vinyl compound may be exemplified by a vinyl aromatic compound, or a vinyl alicyclic hydrocarbon compound.

Specific examples of vinyl aromatic compound include styrenes such as styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrenre, monofluorostyrene, and 4-phenylstyrene.

Specific examples of vinyl alicyclic hydrocarbon compound include vinylcyclohexanes such as vinylcyclohexane, 3-methylisopropenylcyclohexane; and vinylcyclohexenes such as 4-vinylcyclohexene, 4-isopropenylcyclohexene, 1-methyl-4-vinylcyclohexene, 1-methyl-4-isopropenylcyclohexene, 2-methyl-4-vinylcyclohexene, and 2-methyl-4-isopropenylcyclohexene.

In the present invention, the monomer described above and the other monomer capable of copolymerizing may be copolymerized. Examples of the monomer capable of copolymerization include an α-olefin monomer such as ethylene, propylene, isobutene, 2-methyl-1-butene, 2-methyl-1-pentene, and 4-methyl-1-pentene; a cyclopentadiene monomer such as cyclopentadiene, 1-methylcyclopentadiene, 2-methylcyclopentadiene, 2-ethylcyclopentadiene, 5-methylcyclopentadiene, 5,5-dimethylcyclopentadiene, and dicyclopentadiene; a monocyclic olefin monomer such as cyclobutene, cyclopentene, and cyclohexene; a conjugated diene monomer such as butadiene, isoprene, 1,3-pentadiene, furan, thiophene, and 1,3-cyclohexadiene; a nitrile monomer such as acrylonitrile, methacrylonitrile, and α-chloroacrylonitrile; a(n) (metha) acrylic ester monomer such as methyl methacrylate, ethyl methacrylate, propyl methacrylate, butyl methacrylate, methyl acrylate, ethyl acrylate, propyl acrylate, butyl acrylate; an unsaturated fatty acid monomer such as acrylic acid, methacrylic acid, and maleic anhydride; phenylmaleimide; methyl vinyl ether; and a heterocyclic ring-containing vinyl compound monomer such as N-vinylcarbazole, and N-vinyl-2-pyrrolidone.

Mixture of the monomer used for the polymerization preferably contains generally 50% by mass or more, preferably 70 to 100% by mass, and more preferably 80 to 100% by mass of a vinyl aromatic compound and/or a vinyl alicyclic hydrocarbon compound. The mixture of monomer may contain both vinyl aromatic compound and vinyl alicyclic hydrocarbon compound.

[(iv) Other Polymer]

(iv) The other polymer may be exemplified by for example, a ring-opening polymer of a norbornene monomer, an addition polymer of a norbornene monomer, an addition polymer of norbornene monomer and a vinyl compound (such as ethylene and α-olefin), a polymer of monocyclic alkene, a polymer of an alicyclic conjugated diene monomer, a polymer of a vinyl alicyclic hydrocarbon monomer, an aromatic olefin polymer, or the like. Even if the structure is not contained in the above (i) to (iii), the structure may be arbitrarily selected in the range of the general formula (2). For example, those obtained by copolymerizing the above (i) to (iii) each other or known monomer capable of copolymerizing may be exemplified.

For the type of the copolymerization, there is no limitation in the present invention, known, various copolymerization types such as a random copolymer, a block copolymer, an alternating copolymerization, may be applied, but random copolymer may be preferably applied.

Among the polymer classified broadly into 4 types, preferred one in optical properties is (i) a copolymer of ethylene or α-olefin with cyclic olefin, and most preferred is an ethylene tetracyclo[4.4.0.1$^{2,5}$.1$^{7,10}$]-3-dodecene copolymer.

(Other Structure Capable of Using as Part of Main Chain)

The polymer having an alicyclic structure used in the present invention may contain a repeating structural unit derived from the other monomer capable of polymerizing, if necessary, within the range of not losing excellent properties of the product obtained by the molding method of the present invention. The copolymerization ration is not limited, but preferably 20% by mole or less, and more preferably 0 to 10% by mole. When the polymerization amount is 20% by mole or less, the high-accuracy optical component can be obtained without losing the optical properties. In addition, the type of the copolymerization is not limited.

(Molecular Weight of Polymer Having Alicyclic Structure in at Least Part of Repeating Structural Unit)

The molecular weight of the polymer having an alicyclic structure used in the present invention is not limited, but when intrinsic viscosity [η] is used as an alternative indicator of the molecular weight, the intrinsic viscosity [η] measured in decalin at the temperature of 135° C. is preferably 0.03 to 10 dl/g, more preferably 0.05 to 5 dl/g, and most preferably 0.10 to 2 dl/g. With the intrinsic viscosity [η] in the above range, the excellent moldability can be obtained, and the mechanical strength is not lost.

(Glass Transition Temperature (Tg) of Polymer Having Alicyclic Structure in at Least Part of Repeating Structural Unit)

The glass transition temperature (Tg) of the polymer having alicyclic structure in at least a part of repeating structural unit is preferably 50 to 240° C., more preferably 50 to 160° C., and most preferably 100 to 150° C. With the glass transition temperature (Tg) in the above range, sufficient heat resistance can be obtained, and the excellent moldability can be obtained upon using the molded article as the optical component.

The measurement apparatus for the glass transition temperature is not limited. For example, the glass transition temperature of the thermoplastic amorphous resin can be measured by the use of the differential scanning calorimeter (DSC). For example, there is exemplified the method measuring the glass transition temperature at a rate of temperature increase of 10° C./minute by the use of DSC-20 manufacture by Seiko Instruments & Electronics Ltd.

The polymer having the alicyclic structure can be produced as follows, respectively.

(i) A copolymer of ethylene or α-olefin with cyclic olefin can be produced by arbitrarily selecting the conditions in accordance with the method disclosed in Japanese Unexamined Patent Application Publication Nos. 60-168780, 61-120816, 61-115912, 61-115916, 61-271308, 61-272216, 62-252406, and 62-252407. (ii) A ring-opening polymer or the hydrogenation product thereof can be produced by arbitrarily selecting the conditions in accordance with the method disclosed in Japanese Unexamined Patent Application Publication Nos. 60-26024, 9-268250, 63-145324, and 2001-72839. (iii) A hydrogenation product of polystyrene derivative can be produced by arbitrarily selecting the conditions in accordance with the method disclosed in WO 01/092412, Japanese Unexamined Patent Application Publication Nos. 2003-276047, and 2004-83813.

In addition, in the process of producing the polymer having alicyclic structure, the optical properties such as heat resistance and transparency of the polymer can be improved by at least once contacting the hydrogen addition catalyst and hydrogen with the polymer or the system including the polymer and the monomer which is raw material thereof to hydrogenate at least a part of an unsaturated bond contained in the polymer and/or the monomer. Herein, the hydrogenation, so-called, the hydrogen addition can be performed by the heretofore known method.

[Hindered Amine Compound]

The hindered amine compound used in the present invention may be exemplified by the compound represented by the following general formula (1). The hindered amine compound used in the present invention has a steric hindrance amine structure.

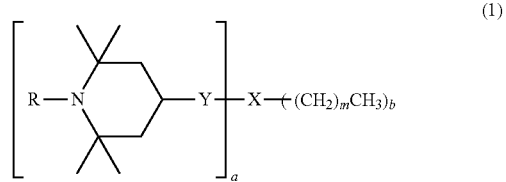

In the formula (1), R is a hydrogen atom, an alkyl group having 1 to 9 carbon atoms, an alkoxy group having 1 to 9 carbon atoms, or an acyl group having 2 to 9 carbon atoms, preferably a hydrogen atom and a methyl group, and more preferably a hydrogen atom. With the structure, sufficient weather resistance can be obtained.

X is a direct bond, or an (a+b)-valent group having a molecular weight of 12 to 10,000 and containing at least one selected from a carbon atom, a hydrogen atom, an oxygen atom, a nitrogen atom, a phosphorus atom. The structure of the group is not limited, when with the molecular weight is 10,000 or less, sufficient transfer speed in the resin can be obtained, and thus the excellent light resistance can be obtained without losing the optical properties.

Y is a direct bond, or a group having a molecular weight of 12 to 10,000 containing at least one selected from a carbon atom, a hydrogen atom, an oxygen atom, a nitrogen atom, a phosphorus atom.

R, X, and Y may be present in one kind alone, or in a combination of two or more kinds at any ratio.

a and b is the number of each structural unit in the molecule, either is a real number of 1 or more. When a is more than 0, the light resistance is expressed, when b is more than 0, the affinity with the resin can be obtained. There is a case that one in which a part of a and/or b is 0 is mixed. In the case, one in which a part of a and/or b is 0 is mixed may be also used. In addition, a is from 1 to 50, preferably a real number of 1 to 40, b is from 1 to 50, and preferably a real number of 1 to 40. With a and b in the above range, sufficient transfer speed of the hindered amine compound in the resin can be obtained, and thus the balance of the optical properties is not lost.

In addition, m is a real number of 0 to 50, preferably a real number of 1 to 50, more preferably a real number of 3 to 50, even more preferably from 5 to 50, and particularly preferably from 5 to 34. With m in the above range, the affinity with the resin can be obtained, and thus excellent light resistance can be obtained.

In addition, as for the preferred example of the hindered represented by the general formula (1), at least one structure selected from the following general formula (11) to (13) is preferred, for the reasons of availability, stability, and the like.

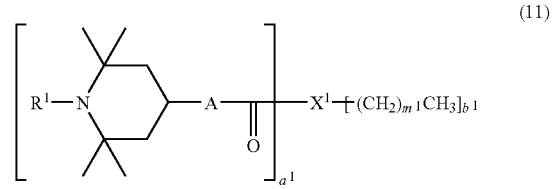

In the formula (11), A is an oxygen atom or NH. $R^1$ is a hydrogen atom, an alkyl group having 1 to 9 carbon atoms, an alkoxy group having 1 to 9 carbon atoms, or an acyl group having 2 to 9 carbon atoms. $X^1$ is at least one hydrocarbon group having a molecular weight of 12 to 100. Herein, A, $R^1$, and $X^1$ may be present in one kind alone, or in a combination of two or more kinds at any ratio. $m^1$ is a real number of 0 to 50, $a^1$ is a real number of 1 to 3, and $b^1$ is a real number of 1 to 3.

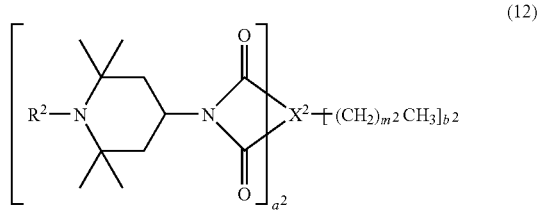

(12)

In the formula (12), $R^2$ is a hydrogen atom, an alkyl group having 1 to 9 carbon atoms, an alkoxy group having 1 to 9 carbon atoms, or an acyl group having 2 to 9 carbon atoms. $X^2$ is at least one hydrocarbon group having a molecular weight of 12 to 100,000. $R^2$ and $X^2$ may be present in one kind alone, or in a combination of two or more kinds at any ratio. $m^2$ is a real number of 0 to 50, $a^2$ is a real number of 1 to 50, and $b^2$ is a real number of 1 to 50.

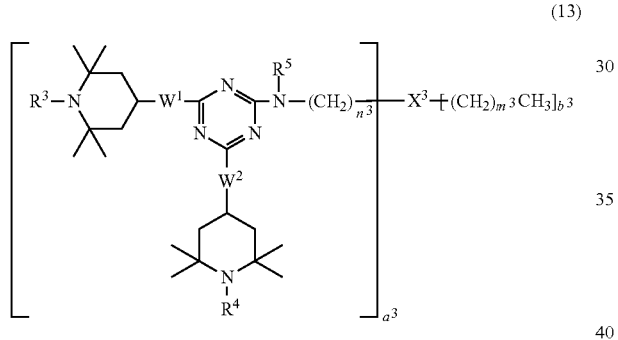

(13)

In the formula (13), $R^3$ and $R^4$ is each independently a hydrogen atom, an alkyl group having 1 to 9 carbon atoms, an alkoxy group having 1 to 9 carbon atoms, or an acyl group having 2 to 9 carbon atoms, preferably an alkyl group having 1 to 4 carbon atoms, an alkoxy group and an acyl group having 1 to 8 carbon atoms, and particularly preferably a hydrogen atom and a methyl group.

$R^5$ is a hydrogen atom or an alkyl group having 1 to 9 carbon atoms, preferably a hydrogen atom or an alkyl group having 1 to 4 carbon atoms, and particularly preferably a hydrogen atom or a methyl group.

$X^3$ is NH or an oxygen atom, and particularly preferably NH.

$W^1$ and $W^2$ are each independently an oxygen atom or $N(R^6)$, and preferably $N(R^6)$. When $W^1$ or $W^2$ is $N(R^6)$, $R^6$ is a hydrogen atom, an alkyl group having 1 to 9 carbon atoms, particularly preferably an alkyl group having 2 to 6 carbon atoms, and most preferably an n-butyl group.

$R^3$, $R^4$, $R^5$, $R^6$, $W^1$, $W^2$, and $X^3$ may be present in one kind alone, or in a combination of two or more kinds at any ratio.

$m^3$ is a real number of 0 to 50, preferably a real number of 1 to 50, more preferably actual number from 3 to 50, even more preferably actual number from 5 to 34, and particularly preferably actual number from 5 to 17.

$n^3$ is 2 or 3, and preferably 3. $a^3$ is 1 or 2, and preferably 2. $b^3$ is 1 or 2, and preferably 1.

When the lower limit of $m^3$ in the formula (13) is 1 or more, the compound represented by the formula (13) is excellent in compatibility particularly with "(i) a copolymer of ethylene or α-olefin with cyclic olefin" among the polymer having an alicyclic structure. Accordingly, the molded product obtained from the resin composition can effectively inhibit the lowering in light transmittance to a blue-violet laser and the deterioration in optical properties.

Specific examples of the hindered amine compound represented by the general formula (11) include the following chemical formulae [1] to [6]:

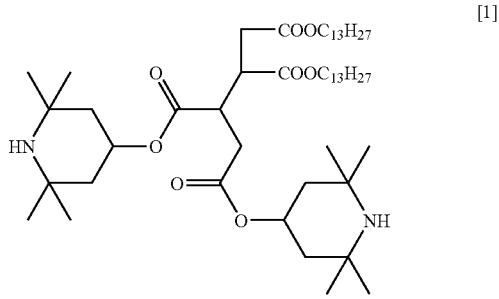

[1]

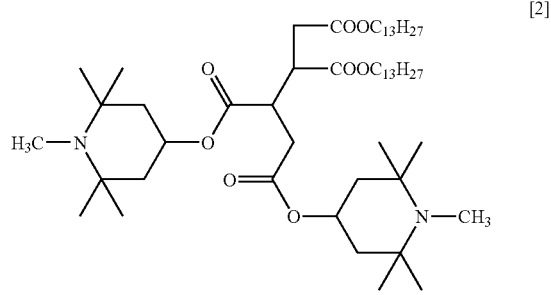

[2]

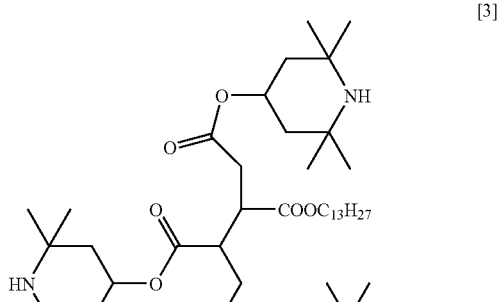

[3]

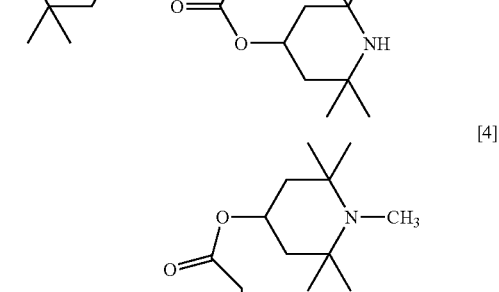

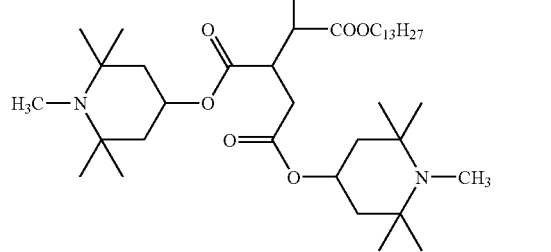

[4]

-continued

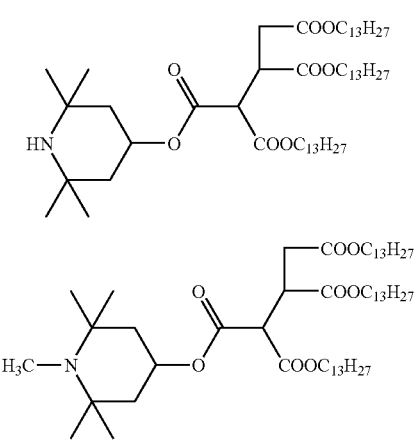
[5]

[6]

Preferred embodiment of the general formula (12) may be exemplified by the structure represented by the general formula (14):

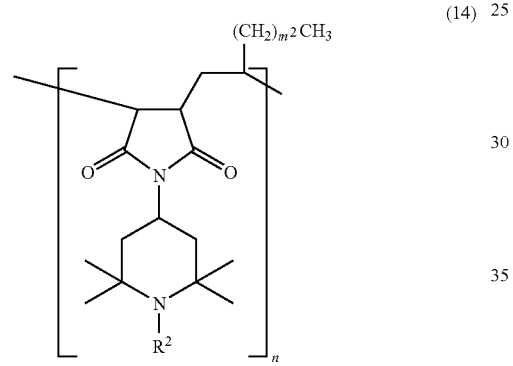
(14)

wherein $R^2$ and $m^2$ are the same as those in the general formula (12), n which shows polymerization degree is a real number of 2 to 50.

Specific examples of the general formula (14) may be exemplified by the following formulae [7] and [8].

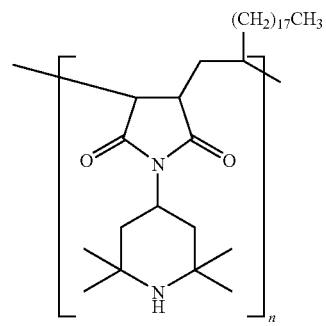
[7]

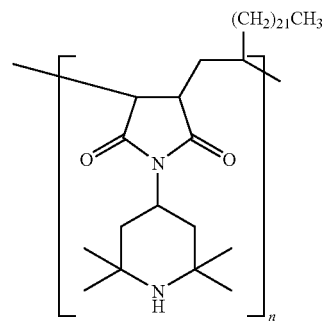
[8]

wherein n which shows a polymerization degree is a real number of 2 to 50.

Specific examples of the general formula (13) may be exemplified by the following formulae [9] to [17]:

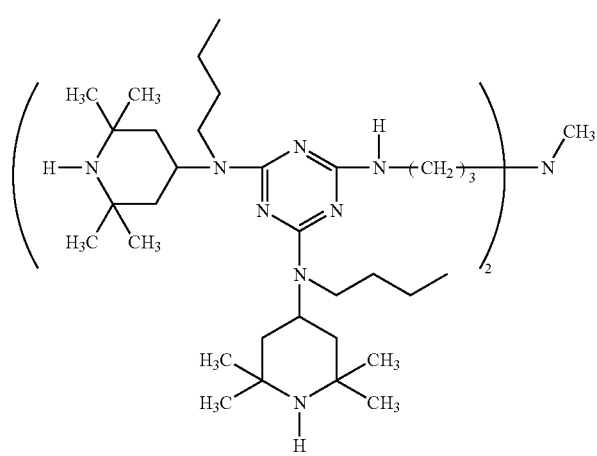
[9]

-continued
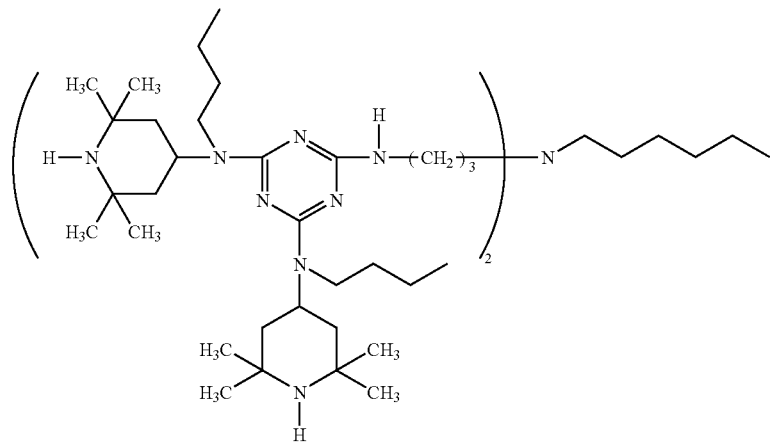
[10]
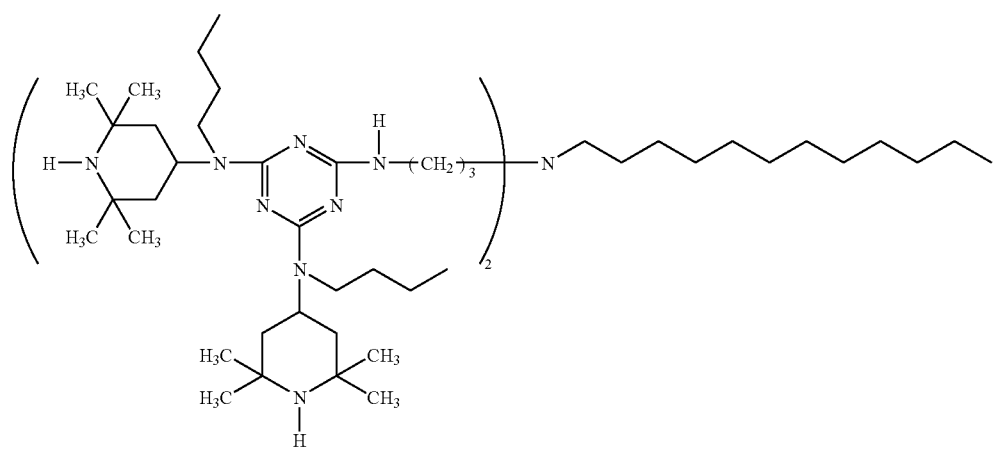
[11]
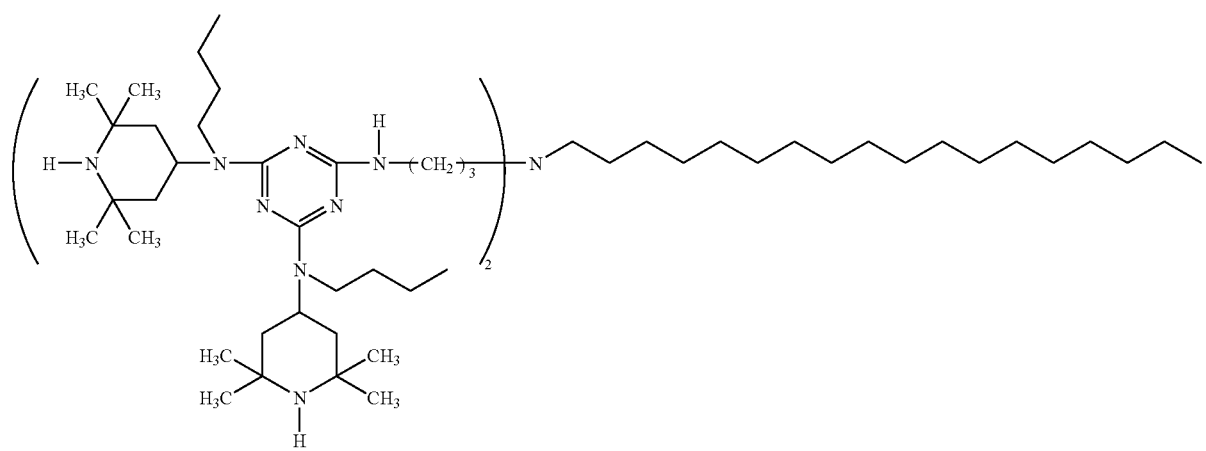
[12]

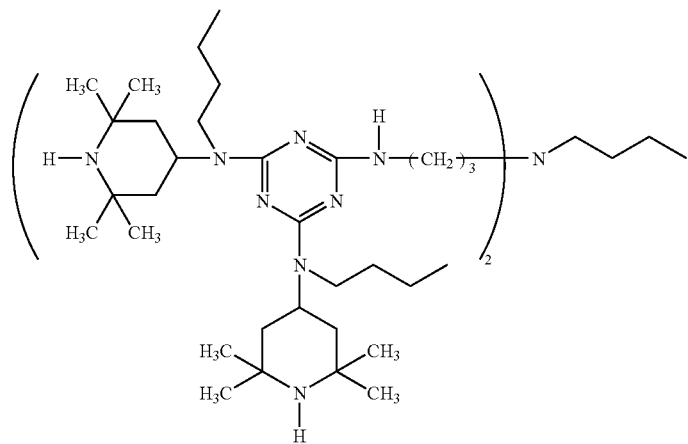
[13]
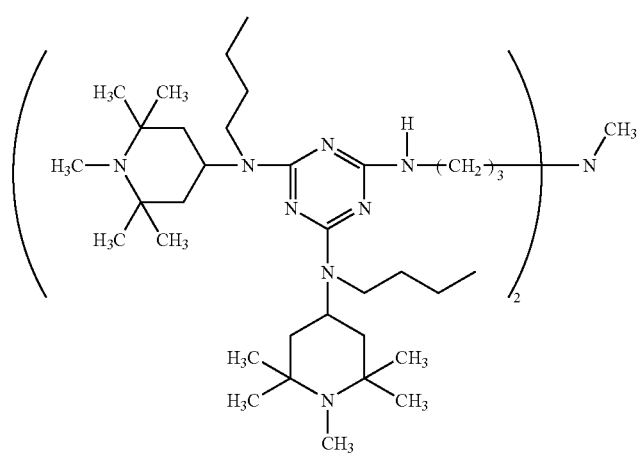
[14]
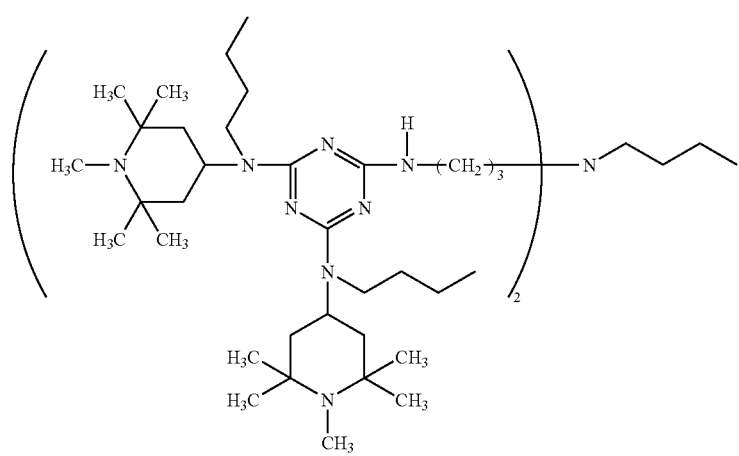
[15]

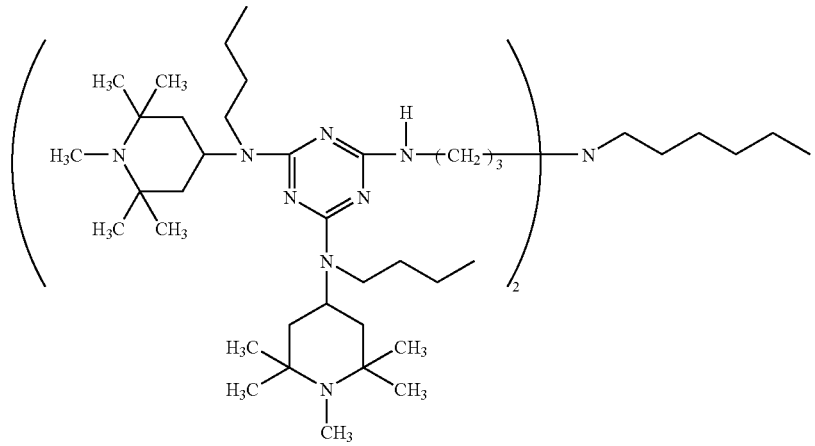

[16]

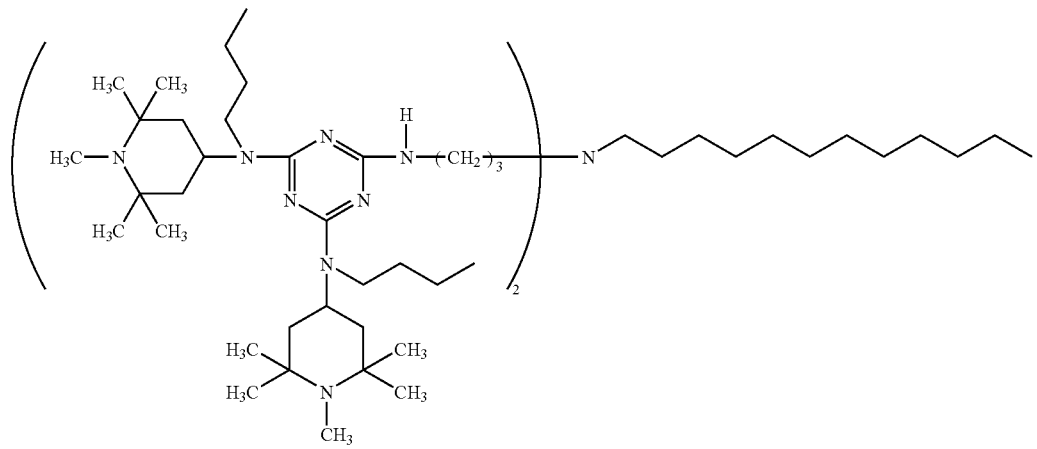

[17]

(Molecular Weight of Hindered Amine Compound)

The molecular weight of the hindered amine compound represented by the general formula (1) is not limited, but those having suitable molecular weight depending on the specific use as the optical component and shape of the molded product should be selected. Since the optical component used for the optical pickup device has various shapes, the molecular weight is not categorically described. However, the molecular weight is for example, preferably 500 to 50,000, more preferably 1,000 to 20,000, and most preferably 1,000 to 10,000. With the molecular weight in the above range, sufficient transfer speed of the hindered amine compound in the resin can be obtained, and thus the excellent light resistance and optical properties can be obtained without losing the optical properties of which the polymer having an alicyclic structure used in the present invention. Furthermore, with the molecular weight in the range, there are no problems that the hindered amine compound stands out needlessly on the surface of the molded product and the optical properties are lost, and thus preferred.

(Additional Amount of Hindered Amine)

The additional amount of the hindered amine used in the present invention is preferably 0.05 to 5 parts by mass, more preferably 0.2 to 5 parts by mass, and most preferably 0.4 to 4 parts by mass, based on 100 parts by mass of the polymer having an alicyclic structure. By the use of the hindered amine compound in the above range, the excellent light resistance can be obtained without losing moldability, mechanical strength, heat resistance, and transparency of the polymer having an alicyclic structure.

(Process for Producing Hindered Amine Compound)

As the hindered amine compound used in the present invention, the compounds represented by the general formulae (11) and (12) is easily available form the market, for example, ADKSTAB LA-67, manufactured by Asahi Denka, Co., Ltd., or Uvinul 5050H manufactured by BASF Corp., may be exemplified. The compound represented by the general formula (13) can be produced by coupling the compound represented by the following general formula (15) and the compound represented by the following general formula (16).

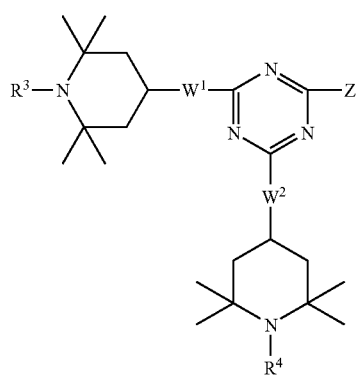

(15)

In the general formula (15), $R^3$ and $R^4$ is a hydrogen atom, an alkyl group having 1 to 9 carbon atoms, an alkoxy group having 1 to 9 carbon atoms, or an acyl group having 2 to 9 carbon atoms, preferably an alkyl group having 1 to 4 carbon atoms, an alkoxy group and an acyl group having 1 to 8 carbon atoms, and particularly preferably a hydrogen group and a methyl group. $W^1$ and $W^2$ may be the same or deferent from each other, and may be an oxygen atom or $N(R^6)$, and preferably $N(R^6)$. When $W^1$ or $W^2$ is $N(R^6)$, $R^6$ is a hydrogen atom, an alkyl group having 1 to 9 carbon atoms, particularly preferably an alkyl group having 2 to 6 carbon atoms, and most preferably an n-butyl group.

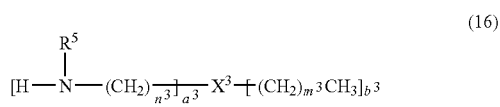

(16)

In the formula (16), $R^5$ is a hydrogen atom or an alkyl group having 1 to 9 carbon atoms, preferably a hydrogen atom or an alkyl group having 1 to 4 carbon atoms, and particularly preferably a hydrogen atom or a methyl group. $X^3$ is NH or an oxygen atom, and particularly preferably NH.

$m^3$ is a real number of 0 to 50, preferably a real number of 5 to 34, and more preferably actual number from 5 to 17. $n^3$ is 2 or 3, and preferably 3. $a^3$ is 1 or 2, and preferably 2. $b^3$ is 1 or 2, and preferably 1.

The compound having two terminal amino groups represented by the general formula (16) is available from commercial product amine having terminal alkyl chain of a straight chain or branched chain in accordance with the known synthesis process, and can be synthesized the methods disclosed in for example, PCT Japanese Translation Patent Publication Nos. 9-506501, and 9-508170.

The process for producing the compound represented by the general formula (13) of the present invention by the reacting the compound represented by the general formula (15) and the compound represented by the general formula (16) will be further explained in detail.

The mole ratio of the compound represented by the general formula (15) and the compound represented by the general formula (16) is most preferably 2:1, but either compound may be supplied in excess quantity. When the excess quantity is supplied, the amount is 1.01 to 10.0-fold, based on the preferable amount. The method for feeding both compounds to the reactor vessel is not particularly limited, for example, the total amount of both compounds may be together transferred to the reactor vessel to start the reaction, or the one compound may be gradually added to the other compound while being reacting (DBU).

The reaction may be carried out in the presence of a deoxidizing agent. Examples of the deoxidizing agent to be used include an inorganic salt such as sodium hydroxide, potassium hydroxide, sodium carbonate, and potassium carbonate; an organic salt such as triethylamine, tributylamine, pyridine, N,N-dimethylaniline, N-methylimidazole, and 1,8-diazabicyclo[5.4.0]undeca-7-ene.

The solvent used for the reaction is not particularly limited, unless the solvent effects the reaction, and may be exemplified by for example, water; saturated hydrocarbons such as pentane, hexane, heptane, and cyclohexane; aromatic hydrocarbons such as benzene, toluene, xylene, mesitylene, and ethylbenezene; halogenated hydrocarbons such as dichloromethane, chloroform, carbon tetrachloride, dichloroethane, chlorobenzene, and dichlorobenzene; ethers such as ethylene glycol dimethyl ether, diethylene glycol dimethyl ether, triethylene glycol dimethyl ether, 1,3-dioxane, 1,4-dioxane, tetrahydrofuran, dimethyl ether, diethyl ether, diisopropyl ether, and dibutyl ether; amides such as N,N-dimethylformamide; nitrites such as acetonitrile; ketones such as acetone, methyl ethyl ketone, and methyl isobutyl ketone; esters such as methyl acetate, and ethyl acetate; sulfur-containing solvents such as dimethyl sulfoxide; or 1,3-dimethyl-2-imidazolidinone (DMI).

These solvent may be used independently or as the mixture. When the solvent is used as the mixture, the solvent may use in any ratio. In addition, the compound represented by the general formula (15) and the compound represented by the general formula (16) which are the raw material, may be reacted being solved in the reaction solvent, or reacted in the state of slurry. When the mixture of an organic solvent which is not compatible with water and water is selected as the reaction solvent, a phase-transfer catalyst such as tetrabutyl ammonium salt (for example, tetrabutyl ammonium hydrogensulfate) may coexist.

The amount of the reaction solvent to be used is not limited, but is in the range of 1 to 1,000 g, preferably 1 to 500 g, and more preferably 1 to 100 g, based on 1 g of the compound represented by the general formula (15) which is raw material.

The present reaction may be carried out at the temperature ranging from 0° C. to a boiling point of the solvent, preferably at 50 to 150° C. When the reaction is carried out in autoclave, the reaction temperature is not limited to the above range, and the reaction is carried out in the range of 0 to 300° C., preferably 0 to 250° C.

The reaction time is not limited, and arbitrarily decided depending on the raw material and the reaction condition, and the like, but is generally 10 minutes to 72 hours.

The isolation method for the compound represented by the general formula (13) of the present invention is not particularly limited. When the product is deposited from the reaction solvent, isolation is possible by a filtration or centrifugation. When the product is dissolved in the reaction solvent, the method for distilling off the solvent under reduced pressure, or the method including adding a suitable solvent to deposit the product, and then filtrating or suitable solvent to deposit the product, and then filtrating or centrifugating the product, may be adapted. Alternatively, the product may be treated with suitable acid to form salt, and then the above procedure may be carried out, and these processes may be carried out in the combination.

[Phosphorus-Containing Stabilizer]

The resin composition of the present invention contains preferably 0.01 to 1 part by mass of the phosphorus-containing stabilizer, based on 100 parts by mass of the polymer having an alicyclic structure in at least a part of repeating structural unit. According to the phosphorus-containing stabilizer, white turbidity generated upon performing laser irradiation to the resin composition of the present invention can be prevented, and the effect is excellent particularly in the above range.

The phosphorus-containing stabilizer is not particularly limited as long as the stabilizer is those generally used in the general resin industry, and may be exemplified by for example, a monophosphite compound such as triphenyl phosphite, diphenyl isodecyl phosphite, phenyl diisodecyl phosphite, tris(nonylphenyl)phosphite, tris(dinonylphenyl)phosphite, tris(2,4-di-t-butylphenyl)phosphite, tris(2-t-butyl-4-methylphenyl)phosphite, tris(cyclohexylphenyl)phosphite, 2,2-methylenebis(4,6-di-t-butylphenyl)octylphosphite, 9,10-dihydro-9-oxa-10-phosphaphenanthrene-10-oxide, 10-(3,5- di-t-butyl-4-hydroxybenzyl)-9,10-dihydro-9-oxa-10-phosphaphenanthrene-10-oxide, and 10-desiloxy-9,10-dihydro-9-oxa-10-phosphaphenanthrene; a diphosphite compound such as 4,4'-butylidene-bis(3-methyl-6-t-buthylphenyl-di-tridecylphosphite), 4,4'-isopropylidene-bis(phenyl-di-alkyl (C12 to C15)phosphate), 4,4'-isopropylidene-bis(diphenyl-monoalkyl(C12 to C15)phosphate), 1,1,3-tris(2-methyl-4-di-tridecylphosphite-5-t-butylphenyl)butane, tetrakis(2,4-di-t-butylphenyl)-4,4'-biphenylene diphosphite, cyclic neopentane tetra-yl bis(isodecylphosphite), cyclic neopentane tetra-yl bis(nonylphenylphosphite), cyclic neopentane tetra-yl bis(2,4-di-t-butylphenylphosphite), cyclic neopentane tetra-yl bis(2,4-dimethylphenylphosphite), and cyclic neopentane tetra-yl bis(2,6-di-t-butylphenylphosphite). In addition, for the purpose of improving hydrolysis resistance, a phosphorus-containing stabilizer having relatively high molecular weight containing a group having high steric hindrance surrounding thereof, for example, tris[2-[[2,4,8,10-tetra-t-butyldibenzo[d,f][1,3,2]dioxaphosphephine-6-yl]oxy]ethyl]amine, those having an ester phosphate structure and a phenol structure in the molecule, for example, 6-[3-(3-t-butyl-4-hydroxy-5-methylphenyl)propoxy]-2,4,8,10-tetrakis-t-butyldibenzo[d,f][1.3.2]dioxaphosphepine, and 6-[3-(3,5-di-t-butyl-4-hydroxyphenyl)propoxy]-2,4,8,10-tetrakis-t-butyldibenzo[d,f][1.3.2]dioxaphosphepine, and the like may be used.

Among these, more preferred are 6-[3-(3-t-butyl-4-hydroxy-5-methylphenyl)propoxy]-2,4,8,10-tetrakis-t-butyldibenzo[d,f][1.3.2]dioxaphosphepine, tris(nonylphenyl)phosphite, tris[2-[[2,4,8,10-tetra-t-butyldibenzo[d,f][1,3,2]dioxaphosphephine-6-yl]oxy]ethyl]amine, tris(dinonylphenyl)phosphite, tris(2,4-di-t-butylphenyl)phosphite, and tris[2-[[2,4,8,10-tetra-t-butyldibenzo[d,f][1,3,2]dioxaphosphephine-6-yl]oxy]ethyl]amine.

[Hydrophilic Stabilizer]

For the resin composition of the present invention, for the purpose of improving the properties of humidity and heat resistance of the resin and improving the mold-releasing properties, and the like, the hydrophilic stabilizer may be preferably added. The hydrophilic stabilizer may be exemplified by for example, polyvalent alcohols disclosed in Japanese Unexamined Patent Application Publication No. 9-241484, polyvalent alcohol, esters of polyvalent alcohol and aliphatic acid, sorbitol derivatives, compounds having a hydrophilic group and hydrophobic group disclosed in Japanese Unexamined Patent Application Publication No. 2001-26718, or the like.

(Polyvalent Alcohol)

The polyvalent alcohol may be exemplified those having molecular weight of 2,000 or less in which the ratio of the number of carbon atom to the number of the hydroxyl group in the molecule is 1.5 to 30, preferably 3 to 20, particularly preferably 6 to 20, and the number of the carbon atom is 6 or more. With the ratio and the number of carbon atom in the above range, the compatibility with the thermoplastic resin is excellent, and thus there is no problem that the foam formation is generated upon a melt kneading and negatively effect in the transparency. Preferred range of the number of carbon atom is 6 to 100, and more preferably 6 to 60.

The polyvalent alcohol is preferably a polyvalent alcohol in which at least one hydroxyl group in the molecule is bonded to a primary carbon atom, or a polyvalent alcohol having 6 or more carbon atoms in which the ratio of the number of hydrocarbon atom/the number of a hydroxyl group is 1.5 to 30.

Examples of polyvalent alcohol of the present invention include those having an ether bond, a thioether bond, an alicyclic hydrocarbon group, and an aromatic hydrocarbon group, and an alicyclic polyvalent alcohol is preferred.

Specific examples of polyvalent alcohol include 3,7,11,15-tetramethyl-1,2,3-trihydroxyhexadecane, dihydroxyoctane, trihydroxyoctane, tetrahydroroxyoctane, dihydroxynonane, trihydroxynonane, tetrahydroxynonane, pentahydroxynonane, hexahydroxynonane, dihydroxytriacontane, trihydroxytriacontane, and eicosahydroxytriacontane. Among these, preferred is 3,7,11,15-tetramethyl-1,2,3-trihydroxyhexadecane.

Specific examples of polyvalent alcohol also include 1,2-hexadecanediol, 2,3-heptadecanediol, 1,3-octadecanediol, and 1,2-decyltetradecanediol.

(Ester of Polyvalent Alcohol and Aliphatic Acid)

As the ester of polyvalent alcohol and aliphatic acid, the sorbitol derivative or the like disclosed in Japanese Unexamined Patent Application Publication No. 2001-26682 is suitably used, since the resin composition in which a transparency is excellent and a lowering in transparency under the atmosphere of high temperature and high humidity is very small is obtained from the sorbitol derivative.

The other ester may be exemplified by those in which a part of glycerin or pentaerythritol is esterified with aliphatic acid ester of polyvalent alcohol disclosed in Japanese Examined Patent Application Publication No. 07-007529.

(Sorbitol Derivative)

The sorbitol derivative may be exemplified by the compounds represented by the following general formulae (17) to (22).

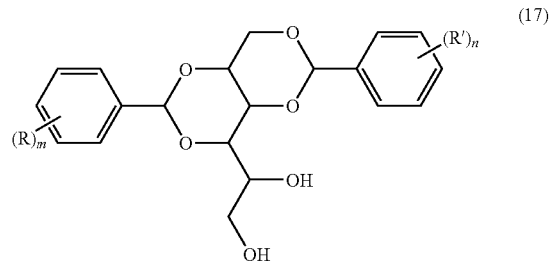

(17)

In the formula (17), each R and R' may be the same or different from each other, and may be any one of an alkyl group having 1 to 8 carbon atoms, a halogen atom, an alkoxy group having 1 to 4 carbon atoms, m and n each is independently an integer from 0 to 3.

Specific examples of the compound represented by the above formula (17) include 1,3,2,4-dibenzylidene sorbitol, 1,3-benzylidene-2,4-p-methylbenzylidene sorbitol, 1,3-benzylidene-2,4-p-ethylbenzylidene sorbitol, 1,3-p-methylbenzylidene-2,4-benzylidene sorbitol, 1,3-p-ethylbenzylidene-2,4-benzylidene sorbitol, 1,3-p-methylbenzylidine-2,4-p-ethylbenzylidene sorbitol, 1,3-p-ethylbenzylidene-2,4-p-methylbenzylidene sorbitol, 1,3,2,4-di(p-methylbenzylidene)sorbitol, 1,3,2,4-di(p-ethylbenzylidene) sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene) sorbitol, 1,3,2,4-di(p-t-butylbenzylidene)sorbitol, 1,3,2,4-di(2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorbenzylidene sorbitol, 1,3-p-chlorbenzylidene-2,4-benzylidene sorbitol, 1,3-p-chlorbenzylidene-2,4-p-methylbenzylidene sorbitol, 1,3-p-chlorbenzylidene-2,4-p- ethylbenzylidene sorbitol, 1,3-p-methylbenzylidene-2,4-p-chlorbenzylidene sorbitol, 1,3-p-ethylbenzylidene-2,4-p-chlorbenzylidene sorbitol, 1,3,2,4-di(p-chlorbenzylidene) sorbitol, and a mixture of these two or more. More preferred are 1,3,2,4-dibenzylidene sorbitol, 1,3,2,4-di(p-methylbenzylidene)sorbitol, 1,3,2,4-di(p-ethylbenzylidene)sorbitol, 1,3-p-chlorbenzylidene-2,4-p-methylbenzylidene sorbitol, 1,3,2,4-di(chlorbenzylidene)sorbitol and a mixture of two or more kinds thereof, may be preferably used.

Among the sorbitol derivative, the preferred example may be exemplified by the compound represented by the following formula (18).

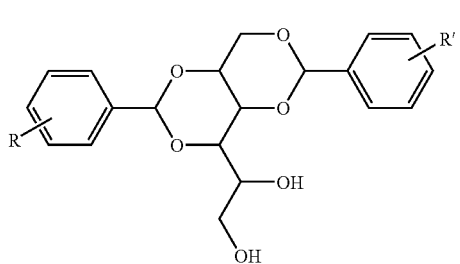
(18)

In the formula (18), R and R' may be the same or different from each other, and may a methyl group or an ethyl group.

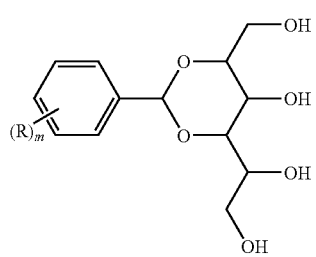
(19)

In the formula (19), a plurality of R's may be the same or different from each other, and may be any one of an alkyl group having 1 to 8 carbon atoms, a halogen atom, an alkoxy group having 1 to 4 carbon atoms, and m is an integer from 0 to 3.

Specific examples of the compound represented by the above formula (19) include 2,4-benzylidene sorbitol, 2,4-p-n-propylbenzylidene sorbitol, 2,4-p-i-propylbenzylidene sorbitol, 2,4-p-n-butylbenzylidene sorbitol, 2,4-p-s-butylbenzylidene sorbitol, 2,4-p-t-butylbenzylidene sorbitol, 2,4-(2',4'-dimethylbenzylidene)sorbitol, 2,4-p-methoxybenzylidene sorbitol, 2,4-p-ethoxybenzylidene sorbitol, 2,4-p-chlorbenzylidene sorbitol and a mixture of two or more kinds thereof.

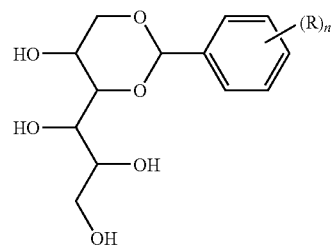
(20)

In the formula (20), a plurality of R's may be the same or different from each other, and may be any one of an alkyl group having 1 to 8 carbon atoms, a halogen atom, an alkoxy group having 1 to 4 carbon atoms, n is an integer from 0 to 3.

Specific examples of the compound represented by the above formula (20) include 1,3-benzylidene sorbitol, 1,3-p-n-propylbenzylidene sorbitol, 1,3-p-i-propylbenzylidene sorbitol, 1,3-p-n-butylbenzylidene sorbitol, 1,3-p-s-butylbenzylidene sorbitol, 1,3-p-t-butylbenzylidene sorbitol, 1,3-(2',4'-dimethylbenzylidene)sorbitol, 1,3-p-methoxybenzylidene sorbitol, 1,3-p-ethoxybenzylidene sorbitol, 1,3-p-chlorbenzylidene sorbitol and a mixture of two or more kinds thereof.

(21)

$$\begin{array}{c} \text{structure with } R^1O, OR^2, OR^3, CH_2OR^4 \end{array}$$

In the formula (21), $R^1$ to $R^4$ is an aliphatic acyl group having 10 to 30 carbon atoms or a hydrogen atom.

Specific examples of the compound represented by the above formula (21) include 1,5-sorbitan monostearate, 1,5-sorbitan distearate, 1,5-sorbitan tristearate, 1,5-sorbitan monolaurate, 1,5-sorbitan dilaurate, 1,5-sorbitan trilaurate, 1,5-sorbitan monopalmitate, 1,5-sorbitan dipalmitate, 1,5-sorbitan tripalmitate and a mixture of two or more kinds thereof.

(22)

$$\begin{array}{c} \text{structure with } R^5O, OR^6, OR^7, CHCH_2OR^8 \end{array}$$

In the formula (22), $R^5$ to $R^8$ is an aliphatic acyl group having 10 to 30 carbon atoms or a hydrogen atom.

Specific examples of the compound represented by the above formula (22) include 1,4-sorbitan monostearate, 1,4-sorbitan distearate, 1,4-sorbitan tristearate, 1,4-sorbitan monolaurate, 1,4-sorbitan dilaurate, 1,4-sorbitan trilaurate, 1,4-sorbitan monopalmitate, 1,4-sorbitan dipalmitate, 1,4-sorbitan tripalmitate and a mixture of two or more kinds thereof.

Among the sorbitol derivative, benzyliden sorbitol derivatives represented by the formulae (17) to (20) is preferred, and benzyliden sorbitol derivative represented by the formulae (17) is more preferred. The sorbitol derivatives represented by the formulae (17) to (22) may be used independently or in the combination of two or more kinds.

For the purpose of improving dispersibility of the sorbitol derivative, the sorbitol derivative may be mixed with aliphatic acid to be used in the present invention. The aliphatic acid to be used may be exemplified by an aliphatic acid having 10 to 30 carbon atoms.

(Other Esters)

As the other ester of polyvalent alcohol and fatty acid ester, those in which a part of alcoholic hydroxyl group is esterified may be used. Specific examples of a part of polyvalent alcohol fatty acid ester to be used include glycerin fatty acid ester such as glycerin monostearate, glycerin monolaurate, glycerin monomyristate, glycerin monopalmitate, glycerin distearate, and glycerin dilaurate; and pentaerythritol fatty acid ester such as pentaerythritol monostearate, pentaerythritol monolaurate, pentaerythritol distearate, pentaerythritol dilaurate, and penterythritol tristearate.

(Compound Having Hydrophilic Group and Hydrophobic Group)

The compound having a hydrophilic group and a hydrophobic group may be exemplified by the an amine compound or an amide compound which are a compounds having a hydrophilic group and a hydrophobic group in the molecule thereof, wherein the hydrophilic group is a hydroxyalkyl group, and the hydrophobic group is an alkyl group having 6 or more carbon atoms.

Specific examples of the compound include myristyl diethanolamine, 2-hydroxyethyl-2-hydroxydodecylamine, 2-hydroxyethyl-2-hydroxytridecylamine, 2-hydroxyethyl-2-hydroxytetradecylamine, pentaerythritol monostearate, pentaerythritol distearate, pentaerythritol tristearate, di-2-hydroxyethyl-2-hydroxydodecylamine, alkyl (having 8 to 18 carbon atoms) benzyldimethyl ammonium chloride, ethylene-bis alkyl (having 8 to 18 carbon atoms) amide, stearyldiethanolamide, lauryl diethanolamide, myristyl diethanolamide, palmityl diethanolamide. Among these, an amine compound or an amide compound having a hydroxyalkyl group is preferably used.

The blended amount of the hydrophilic stabilizer is preferably 0.0001 to 10 parts by mass, more preferably 0.05 to 5 parts by mass, and particularly preferably 0.1 to 3 parts by mass, based on 100 parts by mass of the polymer having an alicyclic structure used in the present invention. By the use of the above amount of the hydrophilic stabilizer, a lowering in light transmittance due to the change of temperature and humidity, and the microcrack generation can be prevented, and thus the optical properties of which the polymer has is not lost.

[Other Stabilizer]

For the resin composition used in the present invention, in addition to the above component, within the range of not losing excellent properties of the optical component of the present invention, known hydrophilic stabilizer, weather resistance stabilizer, heat resistance stabilizer, antistatic agent, flame retardant, slipping agent, antiblocking agent, antifog additive, lubricant, natural oil, synthesis oil, wax, organic or inorganic filler, and the like may be contained.

For example, the weather resistance stabilizer blended as an optional component may be exemplified by an ultraviolet absorber such as a benzophenone-containing compound, a benzotriazole-containing compound, a nickel-containing compound, and a hindered amine-containing compound.

Specific examples of the benzotriazole ultraviolet absorber include a benzotriazole derivative such as 2-(5-methyl-2-hydroxyphenyl)benzotriazole, 2,2-hydroxy-3,5-bis(α,α-dimethylbenzyl)phenyl, 2-(2'-hydroxy-5'-methyl-phenyl)benzotriazole, 2-(2'-hydroxy-3',5'-di-t-butyl-phenyl)benzotriazole, 2-(2'-hydroxy-3'-t-butyl-5'-methyl-phenyl)-5-chlorobenzotriazole, 2-(2'-hydroxy-3',5'-di-t-butyl-phenyl)-5-chlorobenzotriazole, 2-(2'-hydroxy-4'-n-octoxyphenyl)benzotriazole, commercially available Tinuvin 328, Tinuvin PS (both produced by Ciba Geigy Corp.), SEESORB709 (2-(2'-hydroxy-5'-t-octylphenyl)benzotriazole, produced by SHIRAISHI CALCIUM KAISHA, LTD.).

Specific examples of the benzophenone ultraviolet absorber include 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2,2'-dihydroxy-4,4'-dimethoxy-5-sulfobenzophenone, 2-hydroxy-4-methoxy-2'-carboxybenzophenone, 2-hydroxy-4-methoxy-5-sulfobenzophenonetrihydrate, 2-hydroxy-4-n-octoxybenzophenone, 2-hydroxy-4-octadcyloxybenzophenone, 2-hydroxy-4-n-dodecyloxybenzophenone, 2-hydroxy-4-benzyloxybenzophenone, 2,2'4,4'-tetrahydroxybenzophenone, 2-hydroxy-4-dodecyloxybenzophenone, 2-hydroxy-4-(2-hydroxy-3-methacryloxy)propoxybenzophenone, Uvinul 490 (mixture of 2,2'-dihydroxy-4,4'-dimethoxybenzophenone and other tetrasubstituted benzophenone, produced by GAF Inc.), Permyl B-100 (benzophenone compound, produced by Ferro Corp.).

Examples of the hindered amine compound include 2,2,6,6-tetramethyl-4-piperidylstearate, 1,2,2,6,6-pentamethyl-4-piperidylstearate, 2,2,6,6-tetramethyl-4-piperidylbenzoate, N-(2,2,6,6-tetramethyl-4-piperidyl)dodecyl imide succinate, 1-[(3,5-ditertiary butyl-4-hydroxyphenyl)propionyloxyethyl]-2,2,6,6-tetramethyl-4-piperidyl-(3,5-ditertiary butyl-4-hydroxyphenyl)propionate, bis(2,2,6,6-tetramethyl-4-piperidyl)sebacate, bis(1,2,2,6,6-pentamethyl-4-piperidyl)sebacate, bis(1,2,2,6,6-pentamethyl-4-piperidyl)-2-butyl-2-(3,5-ditertiary butyl-4-hydroxybenzyl)malonate, N,N'-bis(2,2,6,6-tetramethyl-4-piperidyl)hexamethylenediamine, tetrakis(2,2,6,6-tetramethyl-4-piperidyl)1,2,3,4-butanetetracarboxylate, tetrakis(1,2,2,6,6-pentamethyl-4-piperidyl)1,2,3,4-butanetetracarboxylate, bis(2,2,6,6-tetramethyl-4-piperidyl)di(tridecyl)1,2,3,4-butanetetracarboxylate, bis(1,2,2,6,6-pentamethyl-4-piperidyl)di(tridecyl)-1,2,3,4-butanetetracarboxylate, 3,9-bis[1,1-dimethyl-2-{tris(2,2,6,6-tetramethyl-4-piperidyloxycarbonyloxy)butylcarbonyloxy}ethyl]-2,4,8,10-tetraoxaspiro[5.5]undecane, 3,9-bis[1,1-dimethyl-2-{tris(1,2,2,6,6-pentamethyl-4-piperidyloxycarbonyloxy)butylcarbonyloxy}ethyl]-2,4,8,10-tetraoxaspiro[5.5]undecane, 1,5,8,12-tetrakis[4,6-bis{N-(2,2,6,6-tetramethyl-4-piperidyl)butylamino}-1,3,5-triazin-2-yl]-1,5,8,12-tetraazadodecane, 1-(2-hydroxyethyl)-2,2,6,6-tetramethyl-4-piperidinol/dimethyl succinate condensate, 2-tertiaryoctylamino-4,6-dichloro-s-triazine/N,N'-bis(2,2,6,6-tetramethyl-4-piperidyl)hexamethylenediamine condensate, N,N'-bis(2,2,6,6-tetramethyl-4-piperidyl)hexamethylenediamine/dibromoethane condensate, 2,2,6,6-tetramethyl-4-hydroxypiperidine-N-oxyl, bis(2,2,6,6-tetramethyl-N-oxylpiperidine)sebacate, tetrakis(2,2,6,6-tetramethyl-N-oxylpiperidyl)butane-1,2,3,4-tetracarboxylate, 3,9-bis(1,1-dimethyl-2-(tris(2,2,6,6-tetramethyl-N-oxylpiperidyl-4-oxycarbonyl)butylcarbonyloxy)ethyl)2,4,6,10-tetraoxaspiro[5.5]undecane, 1,6-bis(2,2,6,6-tetramethyl-4-piperidylamino)hexane/dibromoethane polycondensation, 1,6-bis(2,2,6,6-tetramethyl-4-piperidylamino)hexane/2,4-dichloro-6-tertiary octylamino-s-triazine polycondensation, 1,6-bis(2,2,6,6-tetramethyl-4-piperidylamino)hexane/2,4-dichloro-6-morpholino-s-triazine polycondensation.

Examples of the heat-resistance stabilizer contained as an arbitrary component include a phenol-containing antioxidant such as tetrakis[methylene-3-(3,5-di-t-butyl-4-hydroxyphenyl)propionate]methane, β-(3,5-di-t-butyl-4-hydroxyphenyl)alkyl ester propionate, 2,2'-oxizamidebis[ethyl-3-(3,5-di-t-butyl-4-hydroxyphenyl)propionate; fatty acid metal salt such as zinc stearate, calcium stearate, 1,2-hydroxy calcium stearate; polyvalent alcohol fatty acid ester such as glycerin monostearate, glycerin distearate, pentaerythritol monostearate, pentaerythritol distearate, pentaerythritol tristearate. A phosphorus-containing stabilizer such as distearylpentaerythritol diphosphite, phenyl-4,4'-isopropylidenediphenol-pentaerythritol diphosphite, bis(2,6-di-t-butyl-4-methylphenyl)pentaerythritol diphosphite, tris(2,4-di-t-butylphenyl)phosphite may be also used.

These may be used independently or blended in combination. For example, a combination of tetrakis[methylene-3-(3,5-di-t-butyl-4-hydroxyphenyl)propionate]methan, and zinc stearate, glycerin monostearate, or the like may be exemplified. These stabilizers may be used independently or in the combination of two or more kinds.

The process antioxidant may be exemplified by a phenol-containing antioxidant, a phosphoric-containing antioxidant, a sulfur-containing antioxidant, or the like. Among these, a phenol-containing antioxidant is preferred, and an alkyl substituted phenol-containing antioxidant is particularly preferred.

The phenol-containing antioxidant includes, for example, an acrylate phenol compound such as 2-tertiarybutyl-6-(3-tertiarybutyl-2-hydroxy-5-methylbenzyl)-4-methylphenylacrylate, 2,4-di-tertiaryamyl-6-(1-(3,5-di-tertiaryamyl-2-hydroxyphenyl)ethyl)phenylacrylate described in Japanese Unexamined Patent Publication Nos. 63-179953 and 1-168643; an alkyl substitution phenol compound such as 2,6-di-tertiarybutyl-4-methylphenol, 2,6-di-tertiarybutyl-4-ethylphenol, octadecyl-3-(3,5-di-tertiarybutyl-4-hydroxyphenyl)propionate, 2,2'-methylene-bis(4-methyl-6-tertiarybutylphenol), 4,4'-butylidene-bis(6-tertiarybutyl-m-cresol), 4,4'-thiobis(3-methyl-6-tertiarybutylphenol), bis(3-cyclohexyl-2-hydroxy-5-methylphenyl)methane, 3,9-bis(2-(3-(3-tertiarybutyl-4-hydroxy-5-methylphenyl)propionyloxy)-1,1-dimethylethyl)-2,4,8,10-tetraoxaspiro[5,5]undecane, 1,1,3-tris(2-methyl-4-hydroxy-5-tertiarybutylphenyl)butane, 1,3,5-trimethyl-2,4,6-tris(3,5-di-tertiarybutyl-4-hydroxybenzyl)benzene, tetrakis(methylene-3-(3',5'-di-tertiarybutyl-4'-hydroxyphenylpropionate)methane [that is, pentaerythrimethyl-tetrakis(3-(3,5-di-tertiarybutyl-4-hydroxyphenylpropionate)], triethyleneglycolbis(3-(3-tertiarybutyl-4-hydroxy-5-methylphenyl)propionate), tocophenol; a triazine group-containing phenol compound such as 6-(4-hydroxy-3,5-di-tertiarybutylanilino)-2,4-bisoctylthio-1,3,5-triazine, 6-(4-hydroxy-3,5-dimethylanilino)-2,4-bisoctylthio-1,3,5-triazine, 6-(4-hydroxy-3-methyl-5-tertiarybutylanilino)-2,4-bisoctylthio-1,3,5-triazine, 2-octylthio-4,6-bis(3,5-di-tertiarybutyl-4-oxyanilino)-1,3,5-triazine. Among these, preferred are an acrylate phenol compound and alkyl substitution phenol compound, more preferred is an alkyl substitution phenol compound. In addition, tetrakis(methylene-3-(3',5'-di-tertiarybutyl-4'-hydroxyphenylpropionate)methane is excellent in heat resistance and stability, and thus preferred.

A sulphur-containing antioxidant include, for example, dilauryl-3,3-thiodipropionate, dimyristyl-3,3'-thiodipropionate, distearyl-3,3-thiodipropionate, laurylstearyl-3,3-thiodipropionate, pentaerythritol-tetrakis-(β-lauryl-thio-propionate), 3,9-bis(2-dodecylthioethyl)-2,4,8,10-tetraoxaspiro [5,5]undecane.

A lactone-containing antioxidant is not limited as long as having a lactone structure in the compound, but an aromatic lactone compound is preferred. In particular, more preferred is the compound having a benzofuranone skeleton, still more preferred is 3-arylbenzofuran-2-one having an aryl group as a substituent in the side chain of a furan ring, and 5,7-di-tertiary-3-(3,4-di-methylphenyl)-3H-benzofuran-2-one may be exemplified as the example.

[Process for Producing Resin Composition]

The process for producing the resin composition of the present invention is not particularly limited, but the resin composition may be produced by the known methods. Specifically, pellet form resin composition can be obtained by adding the polymer having an alicyclic structure and the hindered amine compound, and the phosphorus stabilizer and the hydrophilic stabilizer depending on the purpose, furthermore, the other stabilizer within the range which dose not lose the purpose of the present invention, being mixed and then flash dried, or mixing each component by the use of Henschel mixer, Ribon blender, melt blender, homomixer, or the like and then palletized. Furthermore, the molded product can be obtained, in accordance with an injection molding process, an extrusion molding process, a blow molding process, a vacuum molding process, a slash molding process, depending on the shape of target molded product.

(Content of Metal Component)

As for the resin composition of the present invention, the content of an iron atom (Fe) as the metal component contained in the resin composition is preferably 5 ppm or less. The content of the iron atom may be determined in accordance with a known process, including for example, an atomic absorption analysis, or the like. When even a small amount above 5 ppm of an iron atom exists in the resin, the light resistance significantly is lowered, and thus the content of the iron atom is preferably 1 ppm or less, and most preferably 0.5 ppm or less.

(Other Metal Component)

As for the other metal component, the content of the metal component which might lead the deterioration of the resin needs to be in the range which does not impair the effect of the present invention. Examples of the metal component include vanadium, zinc, and calcium. In the present invention, the metal which is mixed into the resin from a raw material, a catalyst, and a process, needs to be minimized. For example, a zinc compound such as zinc stearate used as a hydrochloric acid absorbent also has an effect leading the deterioration of the resin. In addition, when the content of the residual metal catalyst component in the resin is small, the optical properties such as transparency or the like is not lost, thus it being preferred.

(Total Light Transmittance and Spectral Light Transmittance)

When the resin composition of the present invention is used for the optics application, transmitting the light is necessary, thus it is preferable that the light transmittance is excellent. As the light transmittance, the total light transmittance or the spectral light transmittance may be selected in accordance with the application.

When the use is assumed in all light or in the multispectral region, it is necessary that the total light transmittance is excellent, the total light transmittance in the condition of not providing an antireflection film on the surface is 85% or more, and preferably 88 to 93%. When the total light transmittance is 85% or more, the essential light quantity can be ensured. For the measurement method of the total light transmittance, a known method is applied, and the measurement apparatus and the like are not limited, but may be exemplified by for example, the method including the steps of a molding the thermoplastic or amorphous resin into a sheet having a thickness of 3 mm, and measuring the total light transmittance of the sheet by molding the resin composition of the present invention, by the use of the Haze meter, in accordance with ASTM D1003, or the like.

Further, in the case of an optical system, for example, a laser optical system, using only a specific wavelength region, even when the total light transmittance is not relatively high, it can be still used as long as the spectral light transmittance in the specific wavelength region is in a preferred range. In this case, the spectral light transmittance in the used wavelength is preferably 85% or more, more preferably 86 to 93%. When the spectral light transmittance is 85% or more, a required amount of light can be obtained. For the method and apparatus for measurement, a known method may be applied, and specifically a spectrophotometer may be exemplified.

The molded product including the resin composition of the present invention has an excellent light transmittance at a wavelength in the range from 300 nm to 450 nm, more preferably at a wavelength in the range from 390 to 420 nm, and particularly preferably at a wavelength in the range from 400 to 420 nm, for example, a laser beam. The spectral light transmittance at a wavelength in the range from 400 nm is 85% or more, preferably 86 to 93%, and the deterioration is hardly generated, and thus the change of the optical performance in the case of using the molded product as the optical component is hardly generated.

In addition, in case of using the molded product as the optical component, the light transmittance can be further improved by applying a known antireflection film on the surface.

[Optical Component]

The molded product obtained from the resin composition of the present invention is excellent in the light transmittance at a wavelength in the range from 300 nm to 450 nm. Accordingly, the molded product may be used as the optical component in the optical system having a light source containing the wavelength in the range from 300 nm to 450 nm. The optical component is a component used for the optical machine, and specifically exemplified by an analytical cell used for a detector for UV, an optical component used for an imaging system using no UV cut filter, a filter for a solar battery, or the like.

The molded product obtained from the resin composition of the present invention may be also applied particularly suitably for an optical lens and an optical prism such as an imaging system lens of a camera; a lens such as a microscope, an endoscope, an telescope lens; a total light transmittance type lens such as an eyeglass lens; a pickup lens of an optical disk such as a CD, a CD-ROM, a WORM (a write once read many optical disk), an MO (a rewritable optical disk; a magneto optical disk), an MD (a mini disk), and a DVD (a digital video desk); a laser scanning lens such as an fθ lens of a laser beam printer and a lens for a censor; a prism lens of a finder system of a camera; a lens for a optical pickup device such as a sensor lens, a diffraction plate, a collimator, an objective lens, a beam expander, and a beam shaper; or the like. The molded product obtained from the resin composition of the present invention is particularly excellent in the light transmittance at a wavelength in the range from 390 to 420 nm, and thus may be suitably used as a lens for a optical pickup device using a blue-violet laser beam source. The optical disk application may be exemplified by a CD, a CD-ROM, a WORM (a write once read many optical disk), an MO (a rewritable optical disk; a magneto optical disk), an MD (a mini disk), and a DVD (a digital video desk), or the like. Examples of the other optical application include a light guide plate such as a liquid crystal display; an optical film such as a polarization film, a phase difference film, and an optical diffusion film; an optical diffusion film; an optical card; and a liquid crystal display element substrate.

The resin composition of the present invention may be molded in a various form of spherical shape, rod-like shape, plate-like shape, column shape, cylindrical shape, tubular shape, fibrous shape, film shape, or sheet shape, and may be used in the various forms above.

The method of molding for obtaining an optical component is not particularly limited and a known method can be used. For the applications and shapes, although it is different in accordance with the applications and shapes, injection molding method, extrusion molding method, blow molding method, vacuum molding method, and slash molding method can be employed. However, from the viewpoints of moldability and productivity, the injection molding method is preferred. The molding condition is approximately selected according to a purpose of uses or the molding method, but the temperature of the resin in the injection molding method is generally selected from the range of 150 to 400° C., preferably 200 to 350° C., more preferably 230 to 330° C.

Since the resin composition of the present invention is excellent in low birefringence, transparency, mechanical strength, thermal resistance, and low absorption, it is possible to be used in various applications, and particularly it is possible to be used suitably in the optical component used in the optical pickup device.

[Optical Path Difference Providing Structure]

An optical path difference providing structure is a structure having a function of providing a predetermined optical path difference to a predetermined light on at least one optical surface of the optical components through which the light passes.

Hereinafter, it will be described in detail in FIG. 1 which relates to the pickup device.

The molded product obtained from the resin composition of the present invention is disposed in a common optical path of a first light source, a second light source, and a third light source and used in an objective optical component OBL having a diffraction structure. Further, in the objective optical component, a saw-like diffraction structure is provided.

This structure is provided in which fine steps are provided in a concentric pattern about the optical axis, and the light beam passing through neighboring orbicular zones are given by the predetermined optical path difference. By setting a pitch (diffraction power) or a depth (brazed wavelength) of the saw structure, as for the 'optical disc of high density', the light beam from the first light source forms a light-collected spot by the second diffraction light, and as for the DVD, the light beam from the second light source forms a light-collected spot by a first diffraction light.

By using the light having a different diffraction order, an efficiency of diffraction in each case is improved so that the amount of light is secured.

As for the CD, it is preferable that the light beam from the third light source is set to a diffracted light having the order same to that of the DVD, but also may be set to the other suitable order. In this example, the first diffracted light is allowed as in the DVD to form a light-collected spot.

Such diffraction structure is one example of the optical path providing structure, and other known structures of 'phase difference providing structure' or 'multi level structure' may also be employed.

Herein, the optical path difference providing structure is employed so as to correct a spherical aberration caused by the difference in thickness of the light disc format, but it also can be used for correcting the aberration caused by the wavelength difference of the using wavelength or the variation in the using wavelength (mode hop). The former is the correction for a spherical chromatic aberration caused by the wavelength difference of 50 nanometer or more, and the latter is the correction for a small wavelength variation changing within 5 nm.

In this example, an example in which the diffraction structure is provided on the objective optical component is described, but it is also possible to be provided on the other elements such as a collimator or coupling lenses.

It is most preferable to use such material in the optical component having a refracting surface and an aspherical surface.

By using the resin composition of the present invention, prolonged use which is realized only in a glass in the past is now realized, and a lens having the optical path difference providing structure which is impossible in a glass lens can be easily provided.

[Optical Pickup Device]

An optical pickup device is a device having a function of playing back and/or recording information on an optical information recording medium, and which includes a light source for emitting light, and an optical component for irradiating light collecting to the optical information recording medium and/or light reflected from the optical information recording medium. Specifications of the device are not limited. However, in order to describe effects of the present invention, an example of an optical component used for the optical pickup device which can be obtained from the resin composition of the present invention will be described with reference to FIG. 1.

In FIG. 1, the target is the optical pickup device using the light source having the using wavelength of 405 nm, so-called blue-violet laser, which is 3-format compatible of 'optical disc of high density', DVD, and CD. The 'optical disc of high density' having the protective substrate thickness t1 of 0.6 mm is supposed as a first optical information medium, the DVD having the protective substrate thickness t2 of 0.6 mm is supposed as a second optical information recording medium, and the CD having the protective substrate thickness t3 of 1.2 mm is supposed as a third optical information recording medium. Each of D1, D2, and D2 represents the thickness of the substrate.

FIG. 1 is a schematic view showing an optical pickup device related to the present invention.

A laser diode LD1 is the first light source, and the blue-violet laser having a wavelength λ1 of 405 nm is used but the laser having a wavelength in the range of 390 to 420 nm can be appropriately employed. LD2 is a second light source, and the red laser having a wavelength λ2 of 655 nm is used but the laser having a wavelength in the range of 630 to 680 nm can be appropriately employed. LD3 is a third light source, and the infrared laser having a wavelength λ3 of 780 nm is used but the infrared laser having a wavelength in the range of 750 to 800 nm can be appropriately employed.

The laser diode LD2 is so-called light source unit of two-laser in one-package in which two light emitting points of the second light source (light source for DVD) and the third light source (light source for CD) are packed in a same package.

In this package, since the second light source is adjusted to be disposed on an optical axis, the third light source is disposed slightly away from the optical axis thereby resulting difference in an image height. Accordingly, techniques for improving this characteristic are already known so that such techniques can be employed if necessary. In the invention, a correcting plate DP is used to perform the correction. In the correcting plate DP, a grating is formed so that the displacement of the optical axes is corrected.

The solid line from LD2 is the light beam of light source for DVD, and the dashed line is the light beam of light source for CD. A beam splitter BS1 transmits or reflects the light beam of the light source entered from LD1 and LD2 in a direction towards the OBL of objective optical component.

In order to improve a beam quality, the light beam transmitted from the LD1 is entered to a beam shaper BSL, sent to the BS1 mentioned above, and then incident to the collimator CL thereby being collimated to infinite parallel light. After, the light beam is sent to the beam expander BE constituted by the beam splitter BS3 and concave and convex lenses, and then entered to the object lens OBL which is the objective optical component. Next, the light beam forms the light-collected spot on the information recording surface via a protective substrate of the first optical information recording medium. Further, the light beam is reflected on the information recording surface, passed the collimator CL via same path as above, a proceeding direction is converted by the beam splitter BS3, and then the light beam is collected to a sensor S1 via a sensor lens SL1. The light beam is subjected to a photoelectric conversion by the sensor thereby being converted into an electronic signal.

In addition, in-between the beam expander BE and objective lens OBL, a λ/4 (quarter the wavelength) plate not shown is disposed, such that gives a just half the wavelength change between the forwarding and returning process thus changing the polarization direction. Therefore, the proceeding direction of the light beam in the returning direction is changed by the BS3.

The beam shaper BSL has curvatures differing respectively for two directions of a direction perpendicular to the optical axis and a direction perpendicular to such direction (having a curvature of rotation asymmetric for the optical axis).

Each of the light beam emitted from the light source, under the semiconductor light source configuration, has a different divergence angle to two directions of a direction perpendicular to the optical axis and a direction perpendicular to such direction, and forms an elliptical shape as viewed in the optical axis direction, but it is not preferable for the light beam of the light source for the optical disc. Therefore, the light beam is subjected to different refractions in each direction by the beam shaper BSL so that the light beam emitted has an approximately circular cross section. In the invention, the beam shaper BSL is disposed in the optical path of LD1, but it can also be disposed in the optical path of LD2.

In the same manner as in LD1, the light beam transmitted from the LD2 forms a light-collected spot on an optical disc (a second optical information recording medium and a third optical information recording medium), reflects and then is finally collected in the sensor S2. Except that an agreement in the optical paths is made by the BS1, there is no change as compared to LD1.

The objective optical component OBL is a single lens in this FIGURE, but it may be formed of a plurality of optical components if necessary.

Since the resin composition of the present invention has low birefringence, it is obvious that the resin composition can be perfectly used in the device having such configuration.

[Actuator]

In FIG. 1 relating the optical pickup device, a state where the light beam transmitted from each LDs is collected on the information recording face via a protective substrate of the optical disc is described, but a basic position is replaced by an actuator according to the optical disc for playing back/recording, and the focus slide (focusing) is performed from the reference position.

According to the thicknesses of a protective substrate and the size of a pit in each optical information recording medium, a numerical apertures required for the objective optical component OBL is changed. Here, the numerical apertures for CD is 0.45, and the numerical apertures for DVD and 'optical disc of high density' is 0.65, but those may be appropriately selected from the range of 0.43 to 0.5 as for the CD and from the range of 0.58 to 0.68 as for the DVD. IR is a diaphragm to cut unnecessary light.

The parallel light is incident on the objective lens OBL, but a configuration in which a collimation is not provided and a limited divergent light is incident may be employed.

By using the resin composition of the present invention, a long period of use realized only by a conventional method can be realized, and it is obvious that a torque required for an operation by the actuator or the like is significantly decreased as compared to the glass lens.

EXAMPLES

Hereinafter, the present invention will be further explained in detail with the reference to Examples, but the present invention is not limited to these. In Examples and Comparative Examples, the measurement of each characteristics and the measurement method for properties was performed by the following method.

Firstly, Synthesis Example of the hindered amine compound used in the present invention will be described. The melting point is a temperature at which a test piece having a thickness of about 2 to 3 mm from a sample is placed in a capillary, and completely melted by heating it in a bath liquid.

Synthesis Example 1

Synthesis of Compound Represented by Formula [9]

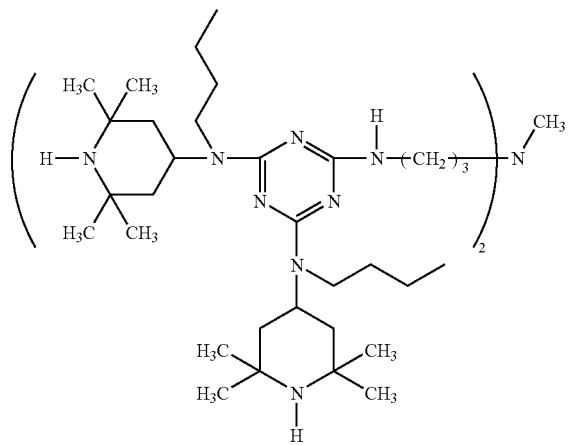

[9]

600 ml of a 1,3-dimethyl-2-imidazolidinone (DMI) solution of 14.5 g of N,N-bis(3-aminopropyl)methylamine, 105.1 g of 2-chloro-4,6-bis(N-(2,2,6,6-tetramethylpiperidin-4-yl) butylamino)-1,3,5-triazine, and 30.4 g of potassium carbonate was stirred at 100° C. for 17 hours. 1.7 g of N,N-bis(3-aminopropyl)methylamine was further added thereto, and the mixed solution was stirred at 100° C. for 12 hours. After standing to cool to room temperature, the mixed solution was added with 500 ml of water, and extracted with 700 ml of ethyl acetate. The organic layer was separated from the solution, washed twice with 500 ml of water, and once with 50 ml of saturated saline, and dried over anhydrous magnesium sulfate. After distilling off the solvent, the concentrated residue was purified by silica gel column chromatography to obtain 75.2 g of a target compound as a white solid.

$^1$H NMR (CDCl$_3$): δ=0.89-0.98 (12H, m), 1.05-1.43 (62H, m), 1.43-1.76 (22H, m), 2.19 (3H, s), 2.40 (4H, t, J=6.8 Hz), 3.30-3.44 (12H, m), 5.18 (4H, br)

MS (FD, m/z): 1144

Melting Point: 85° C.

Synthesis Example 2

Synthesis of Compound Represented by Formula [10]

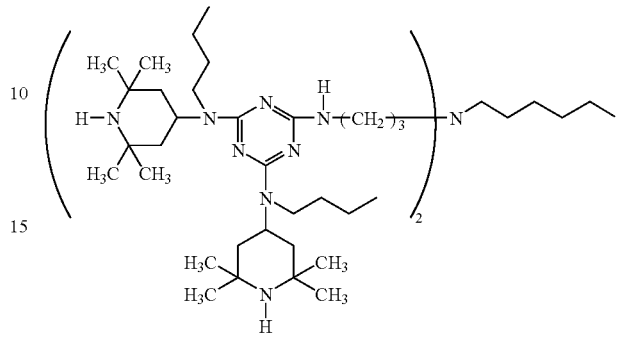

[10]

(1) Synthesis of N,N-bis(2-cyanoethyl)hexylamine 20.1 g of acrylonitrile was added dropwise to an aqueous solution (150 ml) of 15.5 g of hexylamine at room temperature over 0.5 hours, and then the mixed solution was stirred at 70° C. for 3 hours. After standing to cool to room temperature, the mixed solution was extracted with 150 ml of ethyl acetate. The organic layer was separated from the solution, dried over anhydrous magnesium sulfate, and distilled off the solvent to obtain 31.4 g of a target compound as a colorless oily product.

$^1$H NMR (CDCl$_3$): δ=0.89 (3H, t, J=6.5 Hz), 1.23-1.35 (6H, m), 1.35-1.50 (2H, m), 2.38-2.55 (6H, m), 2.86 (4H, t, 6.8 Hz)

(2) Synthesis of N,N-bis(3-aminopropyl)hexylamine 31.0 g of N,N-bis(2-cyanoethyl)hexylamine, 4.65 g of RaneyCo, 150 ml of 1,4-dioxane was charged to an autoclave, and hydrogen addition reaction was carried out by supplying hydrogen at an initial pressure of 9.1 MPa at 110° C. for 2 hours. After removing a catalyst by filtration, the obtained filtrate was concentrated and dried to obtain 32.4 g of a target compound as a pale red oily product.

$^1$H NMR (CDCl$_3$): δ=0.88 (3H, t, J=6.6 Hz), 1.26-1.34 (6H, m), 1.34-1.50 (2H, m), 1.50-1.69 (4H, m), 2.35-2.47 (6H, m), 2.67-2.79 (4H, m)

GC-MS (m/z): 215

(3) Synthesis of Compound Represented by Formula [10]

1,000 ml of a 1,3-dimethyl-2-imidazolidinone (DMI) solution of 21.5 g of N,N-bis(3-aminopropyl)hexylamine, 112.9 g of 2-chloro-4,6-bis(N-(2,2,6,6-tetramethylpiperidin-4-yl) butylamino)-1,3,5-triazine, and 30.4 g of potassium carbonate was stirred at 100° C. for 14 hours. 3.2 g of N,N-bis(3-aminopropyl)hexylamine was further added the solution, and stirred 100° C. for 11 hours. After standing to cool to room temperature, the mixed solution was added with 500 ml of water, and extracted with 700 ml of ethyl acetate. The organic layer was separated from the solution, washed twice with 500 ml of water, once with 30 ml of saturated saline, and dried over anhydrous magnesium sulfate. After distilling off the solvent, the concentrated residue was purified by silica gel column chromatography to obtain 57.0 g of a target compound as a white solid.

$^1$H NMR (CDCl$_3$): δ=0.84-0.94 (15H, m), 1.05-1.28 (70H, m), 1.28-1.73 (22H, m), 2.35 (2H, t, J=7.6 Hz), 2.46 (4H, t, J=6.4 Hz), 3.29-3.41 (12H, m), 5.15 (4H, br)

MS (FD, m/z): 1214

Melting Point: 72° C.

Synthesis Example 3

Synthesis of Compound Represented by Formula [11]

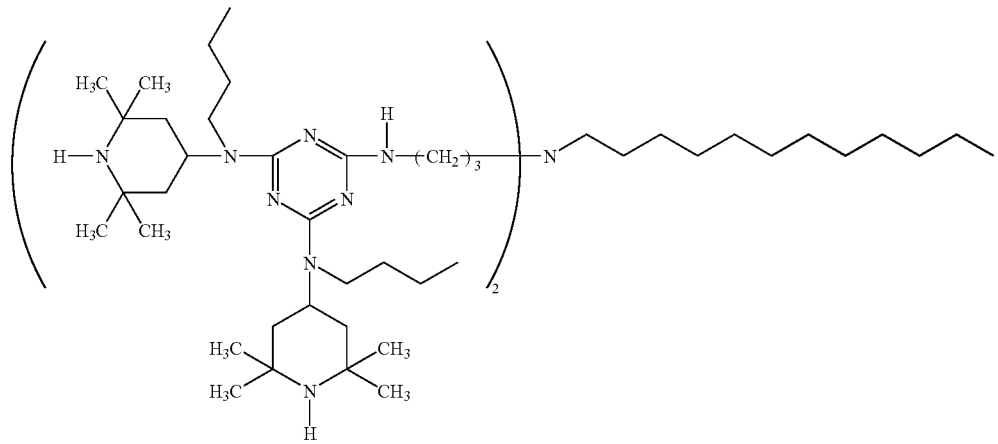

(1) Synthesis of N,N-bis(2-cyanoethyl)dodecylamine 39.8 g of acrylonitrile was added dropwise to an ethanol solution (150 ml) of 27.8 g of 1-aminodecane at room temperature over 0.5 hours, 22.5 g of acetic acid was added dropwise thereto over 0.5 hours, and then stirred at 77° C. for 10 hours. After standing to cool to room temperature, the mixed solution was added with 150 ml of water and 22.8 g of 28% ammonia water, and extracted with 330 ml of ethyl acetate. The organic layer was separated from the solution, washed twice with 100 ml of water and 50 ml of saturated saline, dried over anhydrous magnesium sulfate. After distilling off the solvent, the concentrated residue was purified by silica gel column chromatography to obtain 39.7 g of a target compound as a white solid.

$^1$H NMR (CDCl$_3$): δ=0.90 (3H, t, J=6.5 Hz), 1.21-1.32 (18H, m), 1.32-1.51 (2H, m), 2.52-2.59 (6H, m), 2.82 (4H, t, 6.5 Hz)

(2) Synthesis of N,N-bis(3-aminopropyl)dodecylamine 19.7 g of N,N-bis(2-cyanoethyl)dodecylamine, 1.97 g of RaneyCo, 80 ml of 1,4-dioxane was charged to an autoclave, and hydrogen addition reaction was carried out by supplying hydrogen at an initial pressure of 8.2 MPa at 120° C. for 2 hours. After removing a catalyst by filtration, the obtained filtrate was concentrated and dried to obtain 21.0 g of a target compound as pale red oily product. The same procedure was carried out to obtain a total amount of 40.8 g of the target compound as a pale red oily product.

$^1$H NMR (CDCl$_3$): δ=0.88 (3H, t, J=6.5 Hz), 1.26-1.37 (18H, m), 1.37-1.47 (2H, m), 1.53-1.68 (4H, m), 2.35-2.47 (6H, m), 2.72-2.85 (4H, m)

GC-MS (m/z): 299

(3) Synthesis of Compound Represented by Formula [11]

700 ml of a 1,3-dimethyl-2-imidazolidinone (DMI) solution of 30.0 g of N,N-bis(3-aminopropyl)dodecylamine, 107.7 g of 2-chloro-4,6-bis(N-(2,2,6,6-tetramethylpiperidin-4-yl)butylamino)-1,3,5-triazine, and 30.4 g of potassium carbonate was stirred at 100° C. for 16 hours. After standing to cool to room temperature, the mixed solution was added with 500 ml of water, and extracted with 700 ml of ethyl acetate. The organic layer was separated from the solution, washed twice with 500 ml of water, once with 50 ml of saturated saline, and dried over anhydrous magnesium sulfate. After distilling off the solvent, the concentrated residue was purified by silica gel column chromatography to obtain 60.7 g of a target compound as a white solid.

$^1$H NMR (CDCl$_3$): δ=0.83-0.89 (15H, m), 1.11-1.25 (82H, m), 1.25-1.69 (22H, m), 2.32 (2H, t, J=7.6 Hz), 2.43 (4H, t, J=6.4 Hz), 3.27-3.37 (12H, m), 5.24 (4H, br)

MS (FD, m/z): 1298

Melting Point: 60° C.

Synthesis Example 4

Synthesis of Compound Represented by Formula [12]

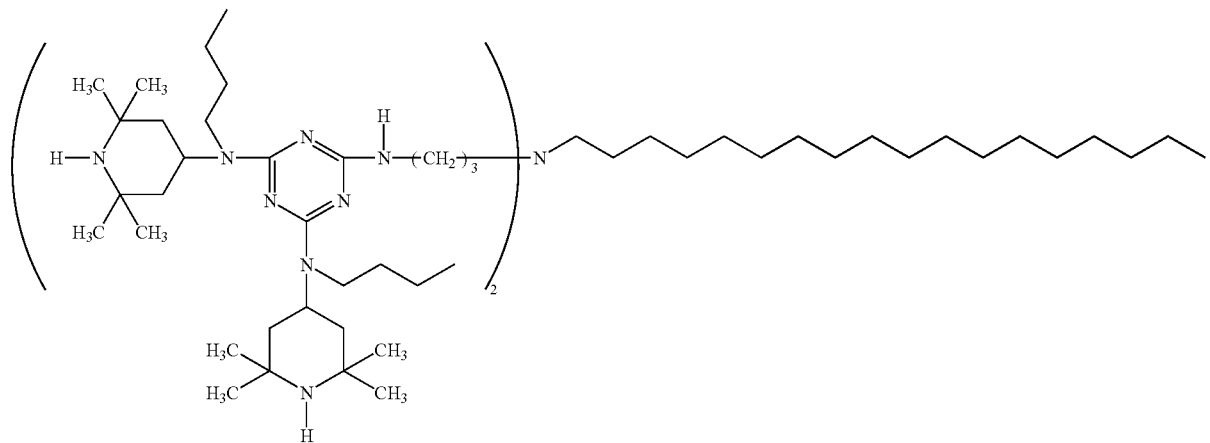

(1) Synthesis of N,N-bis(2-cyanoethyl)octadecylamine 40.2 g of acrylonitrile was added dropwise to an ethanol solution (150 ml) of 41.7 g of stearylamine at room temperature over 0.5 hours, 22.5 g of acetic acid was added dropwise thereto over 0.5 hours, and then stirred at 77° C. for 10 hours. After standing to cool to room temperature, the mixed solution was added with 200 ml of water and 22.8 g of 28% ammonia water, and extracted with 500 ml of ethyl acetate. The organic layer was separated from the solution, washed twice with 100 ml of water and 50 ml of saturated saline, dried over anhydrous magnesium sulfate. After distilling off the solvent, the concentrated residue was recrystallized using isopropyl alcohol as a solvent to obtain 42.4 g of a target compound as a white solid.

$^1$H NMR (CDCl$_3$): δ=0.88 (3H, t, J=6.6 Hz), 1.20-1.38 (30H, m), 1.38-1.47 (2H, m), 2.43-2.55 (6H, m), 2.86 (4H, t, 6.9 Hz)

(2) Synthesis of N,N-bis(3-aminopropyl)octadecylamine 42.1 g of N,N-bis(2-cyanoethyl)octadecylamine, 3.26 g of RaneyCo, 150 ml of 1,4-dioxane was charged to an autoclave, and hydrogen addition reaction was carried out by supplying hydrogen at an initial pressure of 8.0 MPa at 110° C. for 2 hours. After removing a catalyst by filtration, the obtained filtrate was concentrated and dried to obtain 42.3 g of a target compound as a white solid.

$^1$H NMR (CDCl$_3$): δ=0.88 (3H, t, J=6.6 Hz), 1.26-1.36 (30H, m), 1.36-1.47 (2H, m), 1.53-1.66 (4H, m), 2.35-2.50 (6H, m), 2.72-2.79 (4H, m)

GC-MS (m/z): 383

(3) Synthesis of Compound Represented by Formula [12]

900 ml of a 1,3-dimethyl-2-imidazolidinone (DMI) solution of 38.4 g of N,N-bis(3-aminopropyl)octadecylamine, 107.7 g of 2-chloro-4,6-bis(N-(2,2,6,6-tetramethylpiperidin-4-yl)butylamino)-1,3,5-triazine, and 30.4 g of potassium carbonate was stirred at 100° C. for 16 hours. 1.5 g of N,N-bis(3-aminopropyl)octadecylamine was further added to the solution, and stirred at 100° C. for 11.5 hours. After standing to cool to room temperature, the mixed solution was added with 500 ml of water, and extracted with 700 ml of ethyl acetate. The organic layer was separated from the solution, washed twice with 500 ml of water, once with 50 ml of saturated saline, and dried over anhydrous magnesium sulfate. After distilling off the solvent, the concentrated residue was purified by silica gel column chromatography to obtain 74.2 g of a target compound as a white solid.

$^1$H NMR (CDCl$_3$): δ=0.85-0.94 (15H, m), 1.05-1.33 (94H, m), 1.33-1.73 (22H, m), 2.35 (2H, t, J=7.3 Hz), 2.46 (4H, t, J=6.4 Hz), 3.29-3.43 (12H, m), 5.26 (4H, br)

MS (FD, m/z): 1382

Melting Point: 46° C.

Synthesis Example 5
Synthesis of Compound Represented by Formula [13]

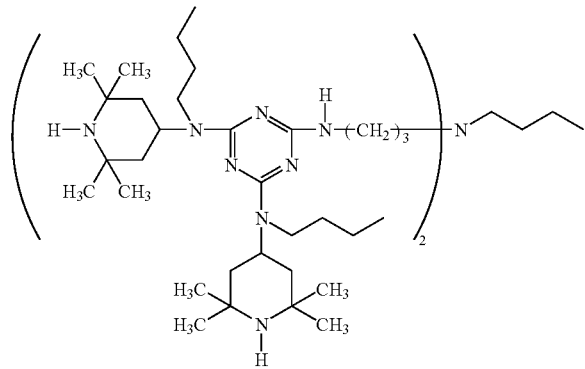

150 ml of N,N-dimethylformamide (DMF) solution of 12.4 g of N,N-bis(3-aminopropyl)butylamine, 64.4 g of 2-chloro-4,6-bis(N-(2,2,6,6-tetramethylpiperidin-4-yl)butylamino)-1,3,5-triazine, and 10.0 g of potassium carbonate was stirred at 120° C. for 8 hours. After standing to cool to room temperature, the mixed solution was added with 450 ml of water, and extracted with 600 ml of ethyl acetate. The organic layer was separated from the solution, washed twice with 450 ml of water, once with 30 ml of saturated saline, and dried over anhydrous magnesium sulfate. After distilling off the solvent, the concentrated residue was purified by silica gel column chromatography to obtain 62.1 g of a target compound as a white solid.

$^1$H NMR (CDCl$_3$): δ=0.80-0.94 (15H, m), 1.12 (24H, s), 1.27 (24H, s), 1.16-1.78 (36H, m), 1.70 (4H, t, J=6.6 Hz), 2.29-2.40 (2H, m), 2.45 (4H, t, J=6.6 Hz), 3.16-3.38 (8H, m), 3.39 (4H, dd, J=5.9, 11.9 Hz), 5.06-5.40 (4H, m)

MS (FD, m/z): 1186

Melting Point: 78° C.

Synthesis Example 6

Synthesis of Compound Represented by Formula [14]

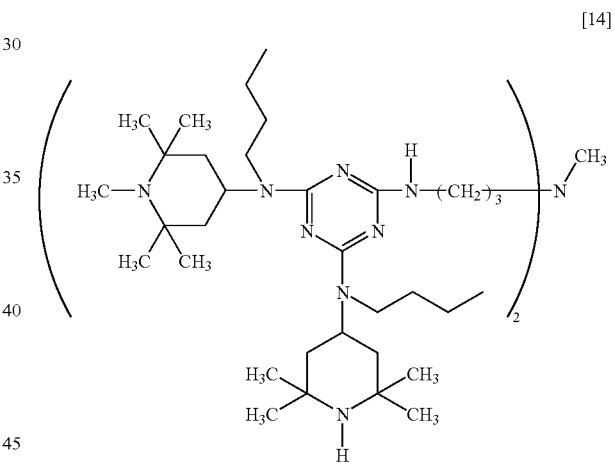

75 ml of N,N-dimethylformamide (DMF) solution of 4.49 g of N,N-bis(3-aminopropyl)methylamine, 33.5 g of 2-chloro-4,6-bis(N-(1,2,2,6,6-pentamethylpiperidin-4-yl)butylamino)-1,3,5-triazine, and 8.21 g of potassium carbonate was stirred at 120° C. for 7 hours. After standing to cool to room temperature, the mixed solution was added with 200 ml of water, and extracted with 300 ml of ethyl acetate. The organic layer was separated from the solution, washed twice with 200 ml of water, once with 30 ml of saturated saline, and dried over anhydrous magnesium sulfate. After distilling off the solvent, the concentrated residue was purified by silica gel column chromatography to obtain 21.2 g of a target compound as a white solid.

$^1$H NMR (CDCl$_3$): δ=0.90 (12H, t, J=6.9 Hz), 1.09 (24H, s), 1.15 (24H, s), 1.10-1.65 (32H, m), 1.72 (4H, t, J=6.9 Hz), 2.18 (3H, s), 2.24 (12H, s), 2.38 (4H, t, J=6.9 Hz), 3.20-3.40 (8H, m), 3.38 (4H, dd, J=6.9, 12.9 Hz), 5.00-5.28 (4H, m)

MS (FD, m/z): 1200

Melting Point: 94° C.

Synthesis Example 7

Synthesis of Compound Represented by Formula [15]

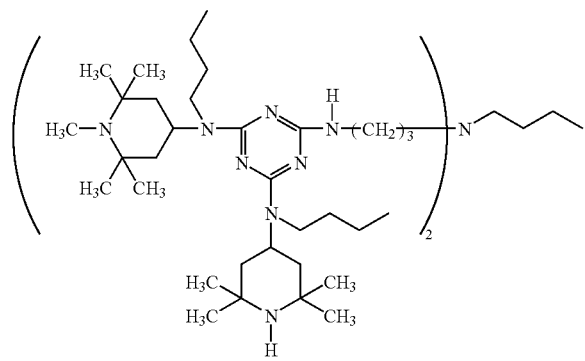

[15]

100 ml of N,N-dimethylformamide (DMF) solution of 8.44 g of N,N-bis(3-aminopropyl)butylamine, 50.8 g of 2-chloro-4,6-bis(N-(1,2,2,6,6-pentamethylpiperidin-4-yl)butylamino)-1,3,5-triazine, and 12.4 g of potassium carbonate was stirred at 120° C. for 7 hours. After standing to cool to room temperature, the mixed solution was added with 400 ml of water, and extracted with 500 ml of ethyl acetate. The organic layer was separated from the solution, washed twice with 400 ml of water, once with 30 ml of saturated saline, and dried over anhydrous magnesium sulfate. After distilling off the solvent, the concentrated residue was purified by silica gel column chromatography to obtain 35.4 g of a target compound as a white solid.

$^1$H NMR (CDCl$_3$): δ=0.82-0.96 (15H, m), 1.09 (24H, s), 1.15 (24H, s), 1.16-1.70 (36H, m), 1.70 (4H, t, J=6.6 Hz), 2.24 (12H, s), 2.31-2.40 (2H, m), 2.45 (4H, t, J=6.6 Hz), 3.18-3.38 (8H, m), 3.38 (4H, dd, J=6.6, 12.5 Hz), 4.95-5.35 (4H, m)

MS (FD, m/z): 1242

Melting Point: 86° C.

Synthesis Example 8

Synthesis of Compound Represented by Formula [16]

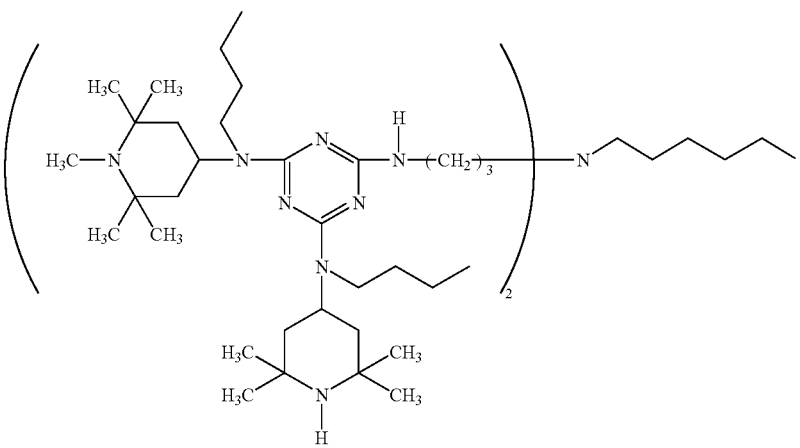

[16]

500 ml of a 1,3-dimethyl-2-imidazolidinone (DMI) solution of 28.8 g of N,N-bis(3-aminopropyl)hexylmethylamine produced in the same manner as the Synthesis Example 2, 120.1 g of 2-chloro-4,6-bis(N-(1,2,2,6,6-pentamethylpiperidin-4-yl)butylamino)-1,3,5-triazine, and 76.5 g of potassium carbonate was stirred at 100° C. for 12 hours. After standing to cool to room temperature, the mixed solution was added with 500 ml of water, and extracted with 700 ml of ethyl acetate. The organic layer was separated from the solution, washed twice with 500 ml of water, once with 30 ml of saturated saline, and dried over anhydrous magnesium sulfate. After distilling off the solvent, the concentrated residue was purified by silica gel column chromatography to obtain 68.4 g of a target compound as a white solid.

$^1$H NMR (CDCl$_3$): δ=0.78-0.96 (15H, m), 1.09 (24H, s), 1.15 (24H, s), 1.10-1.76 (40H, m), 1.70 (4H, t, J=6.6 Hz), 2.24 (12H, s), 2.28-2.40 (2H, m), 2.45 (4H, t, J=6.6 Hz), 3.20-3.40 (8H, m), 3.38 (4H, dd, J=6.6, 12.5 Hz), 5.00-5.28 (4H, m)

MS (FD, m/z): 1270

Melting Point: 81° C.

Synthesis Example 9

Synthesis of Compound Represented by Formula [17]

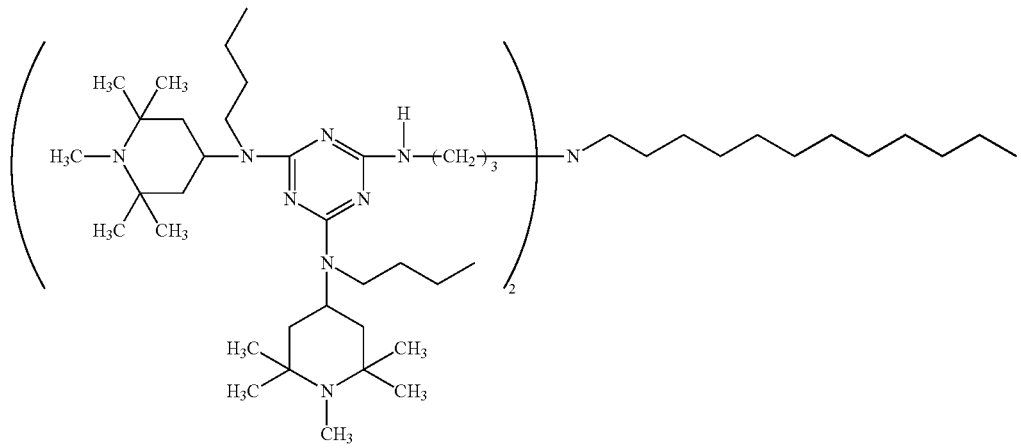

[17]

100 ml of N,N-dimethylformamide (DMF) solution of 12.2 g of N,N-bis(3-aminopropyl)dodecylamine produced in the same manner as the Synthesis Example 3, 45.1 g of 2-chloro-4,6-bis(N-(1,2,2,6,6-pentamethylpiperidin-4-yl)butylamino)-1,3,5-triazine, and 11.1 g of potassium carbonate was stirred at 120° C. for 7 hours. After standing to cool to room temperature, the mixed solution was added with 350 ml of water, and extracted with 400 ml of ethyl acetate. The organic layer was separated from the solution, washed twice with 350 ml of water, once with 30 ml of saturated saline, and dried over anhydrous magnesium sulfate. After distilling off the solvent, the concentrated residue was purified by silica gel column chromatography to obtain 23.3 g of a target compound as a white solid.

$^1$H NMR (CDCl$_3$): δ=0.80-0.96 (15H, m), 1.09 (24H, s), 1.15 (24H, s), 1.10-1.70 (52H, m), 1.70 (4H, t, J=6.6 Hz), 2.24 (12H, s), 2.29-2.39 (2H, m), 2.45 (4H, t, J=6.6 Hz), 3.18-3.40 (8H, m), 3.38 (4H, dd, J=6.6, 12.5 Hz), 5.00-5.32 (4H, m)

MS (FD, m/z): 1354

Melting Point: 67° C.

Next, the measurement method for each property value is as follows.

[Melting Flow Rate (MFR)]

The MFR was measured in accordance with a method of ASTM D1238 at 260° C. under a load of 2.16 kg.

[Softening Temperature (TMA)]

The softening temperature was measured from the thermodeformational behavior of a sheet having a thickness of 1 mm by using a Thermal Mechanical Analyzer manufactured by DuPont. A quartz needle was placed on the sheet, and the softening temperature was measured as a temperature at which the needle is penetrated into a sheet to a depth of 0.635 mm, when applying a load of 49 g, and elevating a temperature at the rate of 5° C./minute.

[Haze]

The Haze was measured accordance with a method of ASTM D1003, by the use of a test piece having an optical surface of 45 mmφ×3 mm (thick) obtained by being subjected to injection molding by the injection molding machine (IS-50 manufactured by TOSHIBA MACHINE CO., LTD) which is set to a cylinder temperature at 260° C. and a mold temperature at 125° C.

[Content of Iron Atom]

100 g of the resin composition was measured off, placed on an evaporating dish, and then heated in air at 400° C. for 30 minutes by using an electric heating furnace to obtain an ash. The amount of an iron atom in the ash was measured by atomic absorption analysis to determine the amount of the iron atom in the resin composition.

[Spectral Light Transmittance at Wavelength of 400 nm (T400)]

The spectral light transmittance at a wavelength of 400 nm was measured by a spectrophotometer by using a test piece having an optical surface of 45 mmφ×3 mm (thick) obtained by performing injection molding by means of an injection molding machine (IS-50 manufactured by TOSHIBA MACHINE CO., LTD) which is set to a cylinder temperature at 260° C. and a mold temperature at 125° C.

[Environmental Test (ΔHaze)]

After the Haze measurement, a test piece was left to stand at 80° C., under the atmosphere of relative humidity of 90% for 48 hours, and then Haze was measured again. The increment of the Haze as compared with before environmental test was determined as ΔHaze.

[Reliability Evaluation with Violet Laser Beam]

By using a laser diode (TC4030S-F405ASU manufactured by NEOARK Corporation), a blue-violet laser beam having a wavelength of 405±10 nm, by 200 mW/cm$^2$, was irradiated to center of the test piece place having an optical surface of 45 mmφ×3 mm (thick) obtained by being subjected to injection molding by the injection molding machine (IS-50 manufactured by TOSHIBA MACHINE CO., LTD) which is set to a cylinder temperature at 260° C. and a mold temperature at 125° C., in thermostatic bath of 60° C., for 1,000 hours. Before irradiation, and every 250 hours after irradiation until 1,000 hour, the RMS value of wave surface in the center 3 mmφ of the test piece was measured to evaluate a variation with time. For the measurement of RMS value, the laser interferometer (PTI 250RS manufactured by Zygo Corporation (linear polarization specification)) was used. In addition, the irradiation part in the test piece was observed with a stereomicroscope, to confirm the presence of absence of a white turbidity and an adherence of foreign substance. The results are indicated, using the following symbols.

(Evaluation of RMS Value)

A: No change of RMS value

B: Rate of change of RMS value was observed less than 0.01λ.

C: RMS value was changed by 0.01λ or more. Alternatively, the measurement was impossible.

(Evaluation of White Turbidity and Adherence of Foreign Substance)

D: The white turbidity and The adherence of foreign substance was significantly observed.

As the hindered amine compound, the phosphorus-containing stabilizer and the hydrophilic stabilizer used in Examples and Comparative Examples, the following compound was used.

(Compound A)

A condensation product of 2,2,6,6-tetramethyl-4-piperidinol, tridecyl alcohol, and 1,2,3,4-butantetracalboxylic acid (trade name: ADECASTAB LA-67 manufactured by ADECA Corporation)

(Compound B)

A 2,2,6,6-tetramethyl-4-piperidyl-C12-21 and C18 unsaturated fatty acid ester (trade name: CYASORB UV-3853 manufactured by CYTEC Industries, Inc.)

(Compound C)

A compound represented by the following formula [13] (trade name: Uvinul 5050H manufactured by BASF Corp., (molecular weight of 3,500, melting point of 125° C.)):

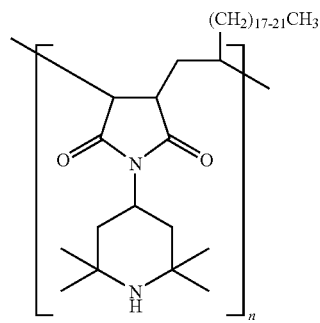

[13]

wherein n is a polymerization degree.

(Compound D)

Bis(2,2',6,6'-tetramethyl-4-piperidyl)sebacate (trade name: TINUVIN 770 manufactured by Chiba-Geigy K.K.)

(Compound E)

A compound represented by the following formula [9] obtained by the Synthesis Example 1.

(Compound F)

A compound represented by the following formula [10] obtained by the Synthesis Example 2.

(Compound G)

A compound represented by the following formula [11] obtained by the Synthesis Example 3.

(Compound H)

A compound represented by the following formula [12] obtained by the Synthesis Example 4.

(Compound I)

A compound represented by the following formula [13] obtained by the Synthesis Example 5.

(Compound J)

A compound represented by the following formula [14] obtained by the Synthesis Example 6.

(Compound K)

A compound represented by the following formula [15] obtained by the Synthesis Example 7.

(Compound L)

A compound represented by the following formula [16] obtained by the Synthesis Example 8.

(Compound M)

A compound represented by the following formula [17] obtained by the Synthesis Example 9.

(Phosphorus-Containing Stabilizer A)

Tris[2-[[2,4,8,10-tetra-t-butylbenzo[d,f][1,3,2]dioxaphosphephin-6-yl]oxy]ethyl]amine (trade name: IRAGAFOS12 manufactured by Chiba-Geigy K.K.)

(Phosphorus-Containing Stabilizer B)

6-[3-(3-t-butyl-4-hydroxy-5-methylphenyl)propoxy]-2,4,8,10-tetrakis-t-butyldibenzo[d,f][1.3.2]dioxaphosphepin (trade name: Sumilizer GP manufactured by Sumitomo Chemical Co., Ltd)

(Hydrophilic Stabilizer)

Pentaerythritol monostearyl ester (trade name: Exepal PE-MS manufactured by Kao Corporation)

[Process for Producing Resin Composition A]

(Preparation of Catalyst)

VO(OC$_2$H$_5$)Cl$_2$ was diluted with cyclohexane to prepare a vanadium catalyst of which the vanadium concentration is 6.7 mmol/L-cyclohexane. Ethylaluminum sesquichloride (Al (C$_2$H$_5$)$_{1.5}$Cl$_{1.5}$) was diluted with cyclohexane to prepare an organoaluminum compound catalyst of which the aluminum concentration is 107 mmol/L-hexane.

(Polymerization)

The copolymerization reaction of ethylene and tetracyclo [4.4.0.1$^{2,5}$,1$^{7,10}$]-3-dodecene was continuously carried out by using a stirring type polymerization apparatus (inner diameter of 500 mm, reaction volume of 100 L). Upon carrying out the copolymerization reaction, the vanadium catalyst prepared by the above process was supplied to the polymerization apparatus so that the vanadium catalysis concentration become 0.6 mmol/L, related to cyclohexane in the polymerization apparatus used as the polymerization solvent.

In addition, ethylaluminum sesquichloride which is organoaluminum compound was supplied to the polymerization apparatus so as to be Al/V=8.0. The copolymerization reaction was continuously carried out at the polymerization temperature of 11° C. and the polymerization pressure of 1.8 kg/cm$^2$G.

(Decalcification)

The polymerization reaction was terminated by adding NaOH solution having the concentration of 25% by weight as water and a pH adjuster, to ethylene-tetracyclo[4.4.0. 1$^{2,5}$,1$^{7,10}$]-3-dodecene copolymer solution extracted from the polymerization apparatus, and the catalyst residue existing in the copolymer was removed (decalcified) from the copolymer solution.

To the cyclohexane solution of ethylene.tetracyclo [4.4.0.1$^{2,5}$,1$^{7,10}$]-3-dodecene copolymer subjected to the decalcification treatment, the phosphorus-containing stabilizer and the hydrophilic stabilizer was added in the amount described in the Table 1, if necessary, and then the cyclohexane solution of the copolymer having the concentration of the copolymer in the cyclohexane is 5% by weight was supplied to the double-pipe heater (outer pipe diameter of 2B, inner pipe diameter of ¾B, and length of 21 m) using steam of 20 kg/cm$^2$G as heat source, in the amount of 150 kg/H to be heated to 180° C., in the heating process.

Next, by the use of the double-pipe flash dryer (outer pipe diameter of 2B, inner pipe diameter of ¾B, and length of 27 m) using steam of 25 kg/cm$^2$G as heat source, and a flash hopper (volume of 200 L), from the cyclohexane solution of the copolymer subjected to the heating process, cyclohexane which is a polymerization solvent as well as most unreacted monomer was removed, to obtain a flash dried cyclic olefin random copolymer in the melt state. Thereafter, by the use of the twin screw kneading extruder with a vent, the cyclic olefin random copolymer in the melt state was charged to the resin insertion site of the extruder, and then the compounds A to M were added in the amount described in the Table 1 to a cylinder site which is located in a downstream side as compared with a vent site, while being aspirated through the trap by the vacuum pump for the purpose of removing a volatile from the vent site, and kneaded and mixed in the downstream side as compared with a vent site. Subsequently, the reactant was made into a pellet by an under water pelletizer equipped to outlet of the extruder, and the obtained pellet was dried with heated air at 100° C. for 4 hours.

The additive amount shown in the Table 1 of the phosphorus stabilizer, the hydrophilic stabilizer, and the compounds A to M is an additive amount (parts by mass), based on 100 parts by mass.

[Process for Producing Resin Composition B]

To a pressure-resistant container purged with nitrogen, 7.68 kg of styrene and 0.32 kg of isoprene were added, mixed, stirred, 32 kg of anhydrated cyclohexane, 0.4 kg of mixed monomer, 0.01 kg of dibutyl ether were charged, 0.0454 kg of hexane solution (concentration of 15%) of n-butyllithium was added while stirring at 50 degrees C. to carried out the polymerization. After a lapse of 0.5 hours from starting the polymerization, 7.6 kg of a mixed monomer was added to the solution continuously over 1 hour. After a lapse of 0.5 hours from completing the addition of the mixed monomer, 0.01 kg of isopropyl alcohol was added to the solution, to obtain a polylmerization reaction solution in which styrene-isoprene random copolymer was dissolved.

Next, to 40 kg of the polymerization reaction solution, 0.3 kg of a stabilized nickel hydrogenated catalyst E22U (60% nickel supported silica-alumina carrier manufactured by Nikki Chemical Co., Ltd.) was added, mixed to obtain a mixed solution, and the mixed solution was charged to an autoclave. To the autoclave, a hydrogen gas was supplied, and the hydrogenation reaction was carried out in the autoclave at 160° C. and 4.5 MPa for 6 hours, wile being stirred. After the hydrogenation reaction is completed, the hydrogenated catalyst is removed by filtering to obtain a colorless transparent solution.

To the cyclohexane solution of hydrogenated styrene-isoprene random copolymer, above phosphorus stabilizer was added in the amount described in the Table 1, and then the cyclohexane solution of the copolymer having the concentration of the copolymer in the cyclohexane is 5% by weight was supplied to the double-pipe heater (outer pipe diameter of 2B, inner pipe diameter of ¾B, and length of 21 m) using steam of 20 kg/cm²G as heat source, in the amount of 150 kg/H to be heated to 180° C., in the heating process.

Next, by the use of the double-pipe flash dryer (outer pipe diameter of 2B, inner pipe diameter of ¾B, and length of 27 m) using steam of 25 kg/cm²G as heat source, and a flash hopper (volume of 200 l), from the cyclohexane solution of the copolymer subjected to the heating process, cyclohexane which is a polymerization solvent as well as most unreacted monomer was removed, to obtain a flash dried vinyl alicyclic hydrocarbon polymer in the melt state. Thereafter, by the use of the twin screw kneading extruder with a vent, the vinyl alicyclic hydrocarbon polymer in the melt state was charged to the resin insertion site of the extruder, and then the compound G or H was added in the amount described in the Table 1 to a cylinder site which is located in a downstream side as compared with a vent site, while being aspirated through the trap by the vacuum pump for the purpose of removing a volatile from the vent site, and kneaded and mixed in the downstream side as compared with a vent site. Subsequently, the reactant was made into a pellet by an under water pelletizer equipped to outlet of the extruder, and the obtained pellet was dried with heated air at 100° C. for 4 hours.

The additive amount of the phosphorus stabilizer and the compound G or H shown in the Table 1 is an additive amount (parts by mass) based on 100 parts by mass.

[Process for Producing Resin Composition C]

To 50 kg of dehydrated cyclohexane, 0.082 kg of 1-hexene, 0.015 kg of dibutyl ether, 0.03 kg of triisobutylaluminum were charged to the reactor and mixed at room temperature under the nitrogen atmosphere, and then 20 kg of 8-methyl-tetracyclo[4.4.0.1$^{2,5}$.1$^{7,10}$]-dodeca-3-ene (methyltetracyclododecene, hereinafter abbreviated to as "MTD") and 8 kg of tungsten hexachloride (0.7% toluene solution) were added thereto continuously over 2 hours to carry out the polymerization.

To the polymerization solution, 0.106 kg of butylglicidyl ether and 0.052 kg of isopropyl alcohol were added to inactivate the polymerization catalyst to terminate the polymerization reaction. Thereafter, to 70 kg of the reaction solution containing the obtained open-ring polymer, 30 kg of cyclohexane was added, and 0.5 kg of a nickel-alumina catalyst (manufactured by Nikki Chemical Co., Ltd.) was further added as the polymerization catalyst. To the solution, hydrogen was supplied to pressurize at 5 MPa, and the solution was heated to 200° C. while stirring to react for 4 hours. Thereafter, the hydrogenation catalyst was removed by the filtration to obtain a colorless transparent solution.

To the cyclohexane solution of a hydrogenated MTD open-ring polymer, the phosphorus stabilizer was added in the amount described in the Table 1, and then the cyclohexane solution of the copolymer having the concentration of the copolymer in the cyclohexane is 5% by weight was supplied to the double-pipe heater (outer pipe diameter of 2B, inner pipe diameter of ¾B, and length of 21 m) using steam of 20 kg/cm²G as heat source, in the amount of 150 kg/H to be heated to 180° C., in the heating process.

Next, by the use of the double-pipe flash dryer (outer pipe diameter of 2B, inner pipe diameter of ¾B, and length of 27 m) using steam of 25 kg/cm²G as heat source, and a flash hopper (volume of 200 l), from the cyclohexane solution of the copolymer subjected to the heating process, cyclohexane which is a polymerization solvent as well as most unreacted monomer was removed, to obtain a flash dried hydrogenation product of the MTD open-ring polymer in the melt state. Thereafter, by the use of the twin screw kneading extruder with a vent, the hydrogenation product of the MTD open-ring polymer in the melt state was charged to the resin insertion site of the extruder, and then the compound G or H was added in the amount described in the Table 1 to a cylinder site which is located in a downstream side as compared with a vent site, while being aspirated through the trap by the vacuum pump for the purpose of removing a volatile from the vent site, and kneaded and mixed in the downstream side as compared with a vent site. Subsequently, the reactant was made into a pellet by an under water pelletizer equipped to outlet of the extruder, and the obtained pellet was dried with heated air at 100° C. for 4 hours.

The additive amount of the phosphorus stabilizer and the compound G or H shown in the Table 1 is an additive amount (parts by mass), based on 100 parts by mass of the polymer.

Examples 1 to 25 and Comparative Examples 1 to 3

According to above process for producing, the resin compositions (A) to (C) containing the phosphorus stabilizer, the hydrophilic stabilizer, and the compounds A to M shown in the Table 1 were produced. The melting flow rate (MFR) and the softening temperature (TMA) of the resin composition is shown in the Table 1.

Next, the obtained resin composition was subjected to an injection molding by the injection molding machine (IS-50 manufactured by TOSHIBA MACHINE CO., LTD) which is set to a cylinder temperature at 260° C. and a mold temperature at 125° C., to prepare a test piece having an optical surface of 45 mmφ×3 mm (thick), and a haze, a spectral light transmittance in a wavelength of 400 nm (T400), a reliability evaluation with a blue-violet laser beam, and an environmental test (ΔHaze) were carried out. The results are shown in the Table 2.

The formulation of an additive in the Example 14 and the Example 15 is same, but the content of an iron atom in the Example 14 and the Example 15 is 0.4 ppm and 5.6 ppm, respectively.

TABLE 1

| | | *2 | | *3 | Compound | | | | | | | | | | | | | MFR | TMA |
| | | A | B | | A | B | C | D | E | F | G | H | I | J | K | L | M | | |
| Unit | *1 | Mass | Mass | Mass | Mass | Mass | Mass | Mass | Mass | Mass | Mass | Mass | Mass | Mass | Mass | Mass | Mass | g/10 | °C. |
|---|---|---|---|---|---|---|---|---|---|---|---|---|---|---|---|---|---|---|---|
| Ex 1 | (A) | 0 | 0 | 0 | 0.1 | 0 | 0 | 0 | 0 | 0 | 0 | 0 | 0 | 0 | 0 | 0 | 0 | 32 | 148 |
| Ex 2 | (A) | 0 | 0 | 0 | 0.5 | 0 | 0 | 0 | 0 | 0 | 0 | 0 | 0 | 0 | 0 | 0 | 0 | 33 | 146 |
| Ex 3 | (A) | 0 | 0 | 0 | 1.5 | 0 | 0 | 0 | 0 | 0 | 0 | 0 | 0 | 0 | 0 | 0 | 0 | 40 | 145 |
| Ex 4 | (A) | 0 | 0 | 0 | 4.0 | 0 | 0 | 0 | 0 | 0 | 0 | 0 | 0 | 0 | 0 | 0 | 0 | 49 | 141 |
| Ex 5 | (A) | 0.1 | 0 | 0 | 0 | 0.5 | 0 | 0 | 0 | 0 | 0 | 0 | 0 | 0 | 0 | 0 | 0 | 32 | 148 |
| Ex 6 | (A) | 0 | 0.3 | 1.5 | 0 | 0 | 2.5 | 0 | 0 | 0 | 0 | 0 | 0 | 0 | 0 | 0 | 0 | 40 | 145 |
| Ex 7 | (A) | 0.3 | 0 | 1.5 | 1.0 | 0 | 0 | 0.8 | 0 | 0 | 0 | 0 | 0 | 0 | 0 | 0 | 0 | 43 | 142 |
| Ex 8 | (A) | 0.5 | 0 | 0 | 0 | 0 | 0 | 0 | 2.0 | 0 | 0 | 0 | 0 | 0 | 0 | 0 | 0 | 38 | 144 |
| Ex 9 | (A) | 0.5 | 0 | 0 | 0 | 0 | 0 | 0 | 0 | 4.0 | 0 | 0 | 0 | 0 | 0 | 0 | 0 | 45 | 141 |
| Ex 10 | (A) | 0.5 | 0 | 0 | 0 | 0 | 0 | 0 | 0 | 0 | 3.0 | 0 | 0 | 0 | 0 | 0 | 0 | 42 | 142 |
| Ex 11 | (A) | 0 | 0.5 | 0 | 0 | 0 | 0 | 0 | 0 | 0 | 0 | 2.0 | 0 | 0 | 0 | 0 | 0 | 48 | 142 |
| Ex 12 | (A) | 0 | 0 | 0 | 0 | 0 | 0 | 0 | 0 | 0 | 0 | 2.0 | 0 | 0 | 0 | 0 | 0 | 47 | 142 |
| Ex 13 | (A) | 0 | 0.5 | 0 | 0 | 1.0 | 0 | 0 | 0 | 0 | 0 | 2.0 | 0 | 0 | 0 | 0 | 0 | 46 | 140 |
| Ex 14 | (A) | 0 | 0.5 | 1.5 | 0 | 0 | 0 | 0 | 0 | 0 | 0 | 2.0 | 0 | 0 | 0 | 0 | 0 | 50 | 140 |
| Ex 15 | (A) | 0 | 0.5 | 1.5 | 0 | 0 | 0 | 0 | 0 | 0 | 0 | 2.0 | 0 | 0 | 0 | 0 | 0 | 48 | 141 |
| Ex 16 | (A) | 0 | 0 | 0 | 0 | 0 | 0 | 0 | 0 | 0 | 0 | 0 | 4.0 | 0 | 0 | 0 | 0 | 46 | 140 |
| Ex 17 | (A) | 0 | 0 | 0 | 0 | 0 | 0 | 0 | 0 | 0 | 0 | 0 | 0 | 2.0 | 0 | 0 | 0 | 39 | 143 |
| Ex 18 | (A) | 0 | 0 | 0 | 0 | 0 | 0 | 0 | 0 | 0 | 0 | 0 | 0 | 0 | 4.0 | 0 | 0 | 46 | 142 |
| Ex 19 | (A) | 0 | 0.3 | 0 | 0 | 0 | 0 | 0 | 0 | 0 | 0 | 0 | 0 | 0 | 0 | 2.0 | 0 | 40 | 144 |
| Ex 20 | (A) | 0 | 0 | 0 | 0 | 0 | 0 | 0 | 0 | 0 | 0 | 0 | 0 | 0 | 0 | 0 | 3.0 | 42 | 141 |
| Ex 21 | (A) | 0 | 0.3 | 0 | 0 | 0 | 0 | 0 | 0 | 0 | 0 | 0 | 0 | 0 | 0 | 0 | 3.0 | 43 | 141 |
| Ex 22 | (B) | 0 | 0.3 | 0 | 0 | 0 | 0 | 0 | 0 | 0 | 0 | 1.5 | 0 | 0 | 0 | 0 | 0 | 25 | 121 |
| Ex 23 | (B) | 0 | 0.3 | 0 | 0 | 0 | 0 | 0 | 0 | 0 | 0 | 0 | 1.5 | 0 | 0 | 0 | 0 | 23 | 120 |
| Ex 24 | (C) | 0 | 0.5 | 0 | 0 | 0 | 0 | 0 | 0 | 0 | 0 | 3.0 | 0 | 0 | 0 | 0 | 0 | 19 | 144 |
| Ex 25 | (C) | 0 | 0.5 | 0 | 0 | 0 | 0 | 0 | 0 | 0 | 0 | 3.0 | 0 | 0 | 0 | 0 | 0 | 18 | 145 |
| Cex 1 | (A) | 0 | 0 | 0 | 0.02 | 0 | 0 | 0 | 0 | 0 | 0 | 0 | 0 | 0 | 0 | 0 | 0 | 30 | 150 |
| Cex 2 | (A) | 0 | 0 | 0 | 6.0 | 0 | 0 | 0 | 0 | 0 | 0 | 0 | 0 | 0 | 0 | 0 | 0 | 55 | 140 |
| Cex 3 | (A) | 0 | 0 | 0 | 0 | 0 | 0 | 1.0 | 0 | 0 | 0 | 0 | 0 | 0 | 0 | 0 | 0 | 34 | 148 |

Ex: Example/Cex: Comparative Example/Mass: Part by mass
*1: Type of resin composition,
*2: Phosphorus-containing stabilizer,
*3: Hydrophilic stabilizer

TABLE 2

| | Optical performance | | | Reliability evaluation with blue-violet laser beam | | | | |
|---|---|---|---|---|---|---|---|---|
| Unit | HAZE % | T400 % | ΔHAZE % | Before test | 250 hours | 500 hours | 750 hours | 1,000 hours |
| Ex 1 | 0.3 | 88.0 | — | — | A | A | B | B |
| Ex 2 | 0.1 | 88.1 | — | — | A | A | A | A |
| Ex 3 | 0.3 | 88.0 | 3.5 | — | A | A | A | AD |
| Ex 4 | 0.9 | 87.5 | — | — | A | A | AD | AD |
| Ex 5 | 0.3 | 87.1 | 4.2 | — | A | A | B | BD |
| Ex 6 | 0.3 | 87.7 | 0.1 | — | A | A | A | A |
| Ex 7 | 1.0 | 86.9 | 0.4 | — | A | AD | AD | AD |
| Ex 8 | 0.4 | 88.0 | — | — | A | A | AD | BD |
| Ex 9 | 0.2 | 87.8 | — | — | A | A | A | A |
| Ex 10 | 0.4 | 88.0 | — | — | A | A | A | A |
| Ex 11 | 0.5 | 87.9 | — | — | A | A | A | A |
| Ex 12 | 0.4 | 88.2 | 1.6 | — | A | A | A | AD |
| Ex 13 | 0.7 | 87.6 | 2.4 | — | A | A | AD | AD |
| Ex 14 | 0.6 | 88.4 | 0.0 | — | A | A | A | A |
| Ex 15 | 0.6 | 87.7 | 0.1 | — | A | A | B | B |
| Ex 16 | 0.4 | 87.5 | — | — | A | A | AD | AD |

TABLE 2-continued

| | Optical performance | | | Reliability evaluation with blue-violet laser beam | | | | |
|---|---|---|---|---|---|---|---|---|
| Unit | HAZE % | T400 % | ΔHAZE % | Before test — | 250 hours — | 500 hours — | 750 hours — | 1,000 hours — |
| Ex 17 | 0.6 | 86.9 | — | — | A | AD | AD | AD |
| Ex 18 | 0.5 | 86.6 | — | — | A | A | AD | AD |
| Ex 19 | 0.3 | 88.0 | — | — | A | A | A | A |
| Ex 20 | 0.4 | 87.1 | — | — | A | A | A | AD |
| Ex 21 | 0.2 | 88.2 | — | — | A | A | A | A |
| Ex 22 | 0.1 | 91.4 | — | — | A | AD | AD | AD |
| Ex 23 | 0.2 | 91.1 | — | — | A | A | AD | AD |
| Ex 24 | 0.4 | 89.2 | — | — | AD | AD | AD | BD |
| Ex 25 | 0.4 | 88.0 | — | — | A | AD | AD | BD |
| Cex 1 | 0.2 | 84.7 | — | — | B | B | B | B |
| Cex 2 | 5.5 | 84.3 | — | D | AD | AD | AD | AD |
| Cex 3 | 0.3 | 87.9 | — | — | AD | BD | BD | BD |

Ex: Example/Cex: Comparative Example

The resin composition of the present invention is a resin composition that is suitable for an optical component which is excellent in maintaining moldability, low birefringence, heat resistance, mass productivity, mechanical strength, and light transmittance, can particularly prevent the lowering in light transmittance during the use of a blue-violet laser beam source, and is very small in the deterioration in optical properties. The optical component produced by the resin composition of the present invention can be suitably used as the optical component used for a optical pickup device.

The invention claimed is:

1. A resin composition comprising:
a polymer having an alicyclic structure in at least a part of repeating structural unit; and
a hindered amine compound selected from the group consisting of chemical formulae [C], [10], [11], [16] and [17],
wherein the hindered amine compound is contained in the amount of 2.0 to 4.0 parts by weight, based on 100 parts by weight of the polymer, and
wherein said polymer is a copolymer comprising ethylene and tetracyclo[4.4.0.1$^{2,5}$,1$^{7,10}$]-3-dodecane:

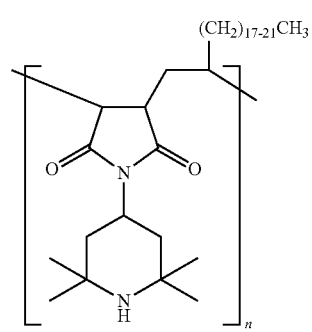

[C]

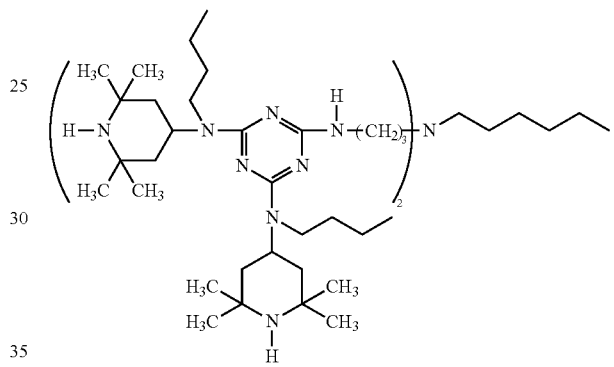

[10]

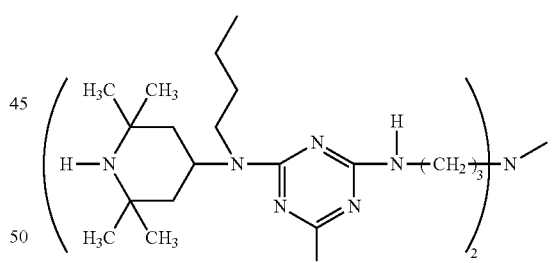

[11]

-continued

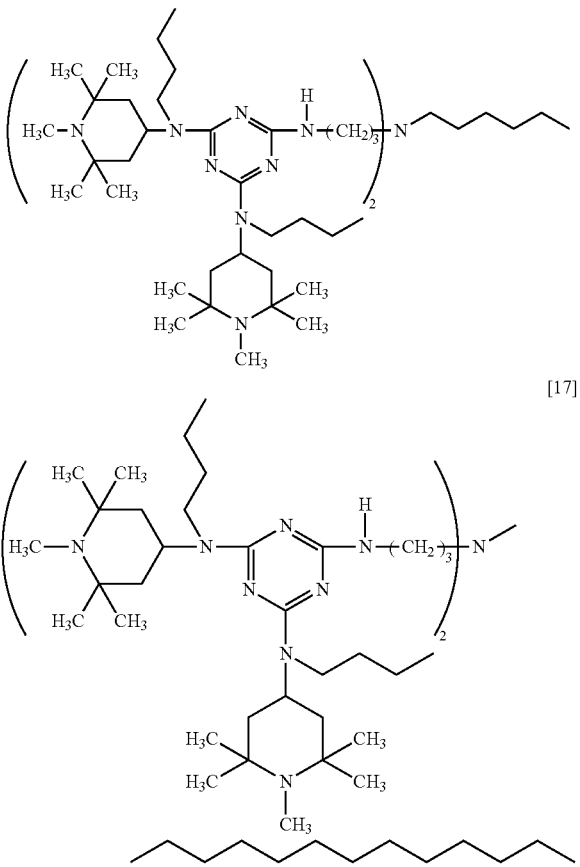

wherein in formula [C], n is a polymerization degree, and the hindered amine compound represented by formula [C] has a molecular weight of 3,500.

2. The resin composition as claimed in claim 1, wherein a molecular weight of the hindered amine compound is from 500 to 50,000.

3. The resin composition as claimed in claim 1, wherein the content of an iron atom is 5 ppm or less.

4. The resin composition as claimed in claim 1, further comprising 0.01 to 1 part by mass of a phosphorus-containing stabilizer, based on 100 parts by mass of said polymer.

5. The resin composition as claimed in claim 1, further comprising 0.05 to 5 parts by mass of a hydrophilic stabilizer, based on 100 parts by mass of said polymer.

6. The resin composition as claimed in claim 1, which is used for molding an optical component.

7. An optical component obtained by molding the resin composition of claim 1.

8. The optical component as claimed in claim 7, which has a structure giving an optical path difference.

9. The optical component as claimed in claim 7, which is used for a optical pickup device.

10. The optical component as claimed in claim 9, wherein said optical pickup device employs a plurality of light sources each having a different wavelength, and allows recording or replaying the information on plural kinds of optical information recording media each having a different substrate thickness.

11. The optical component as claimed in claim 10, wherein at least one of said light source has a wavelength of 390 nm to 420 nm.

12. The optical component as claimed in claim 9, wherein a part of said optical component is held with an actuator to be movable.

13. The optical component as claimed in claim 7, which is used in an optical system having a light source with a wavelength in the range of 300 nm to 450 nm.

14. An optical pickup device employing the optical component as claimed in claim 9.

15. A method using the resin composition according to claim 1 as a material for an optical component.

* * * * *